(12) United States Patent
Scheucher

(10) Patent No.: US 8,815,424 B2
(45) Date of Patent: Aug. 26, 2014

(54) BATTERY PACK SAFETY AND THERMAL MANAGEMENT APPARATUS AND METHOD

(76) Inventor: Karl Frederick Scheucher, Waite Hill, OH (US)

(*) Notice: Subject to any disclaimer, the term of this patent is extended or adjusted under 35 U.S.C. 154(b) by 342 days.

(21) Appl. No.: 13/337,270

(22) Filed: Dec. 26, 2011

(65) Prior Publication Data

US 2012/0092018 A1    Apr. 19, 2012

Related U.S. Application Data

(60) Division of application No. 12/102,012, filed on Apr. 13, 2008, now Pat. No. 8,084,154, and a continuation-in-part of application No. 11/672,853, filed on Feb. 8, 2007, now Pat. No. 8,026,698, and a continuation-in-part of application No. 11/672,957, filed on Feb. 8, 2007, and a continuation-in-part of application No. 11/673,551, filed on Feb. 9, 2007, now Pat. No. 7,838,142, and a continuation-in-part of application No. 11/851,504, filed on Sep. 7, 2007, now Pat. No. 7,948,207.

(60) Provisional application No. 60/911,564, filed on Apr. 13, 2007.

(51) Int. Cl.
| | |
|---|---|
| H01M 10/48 | (2006.01) |
| G01N 27/00 | (2006.01) |
| G01N 27/416 | (2006.01) |
| G01R 31/00 | (2006.01) |
| H01M 2/10 | (2006.01) |

(52) U.S. Cl.
USPC .......................................... 429/50; 324/426

(58) Field of Classification Search
CPC . H01M 10/48; H01M 10/482; H01M 2/1072; H01M 2/1077; G06Q 10/0832
USPC .................. 429/7, 50; 705/330, 332; 324/426
See application file for complete search history.

(56) References Cited

U.S. PATENT DOCUMENTS

| | | |
|---|---|---|
| 3,178,669 A | 4/1965 | Roberts |
| 3,391,374 A | 7/1968 | Schleicher |

(Continued)

FOREIGN PATENT DOCUMENTS

| | | |
|---|---|---|
| DE | 2558456 A | 6/1977 |
| EP | 662725 A1 | 12/1995 |

(Continued)

OTHER PUBLICATIONS

PowerGate LLC, "Cosel 150 Watt Enclosed Single Output Switcher" pp. 1-2, PowerGate LLC 3000 Coronado Dr. 12 Santa Clara, CA 95054—At least as early as the filed of this application.

(Continued)

Primary Examiner — Gregg Cantelmo
(74) Attorney, Agent, or Firm — Woodling, Krost and Rust

(57) ABSTRACT

A process of controlling the temperature of a battery pack includes the steps of determining the operating mode and present temperature of the battery pack. Optimal temperature for the battery pack depends on the operating mode and the difference between the present temperature and the previously identified optimal temperature. The battery pack is warmed if the temperature difference (measured minus optimal) is large. The optimal time interval over which the battery pack should be warmed is a function of the operating mode and the previously calculated temperature difference. A heater is switchably operated enabling and disabling the heat generating element to warm the pack to the previously identified optimal temperature.

1 Claim, 15 Drawing Sheets

(56) References Cited

U.S. PATENT DOCUMENTS

| | | | |
|---|---|---|---|
| 3,543,043 A | 11/1970 | Dunn | |
| 4,193,660 A | 3/1980 | Jaconette | |
| D276,495 S | 11/1984 | Sylvia | |
| 4,555,451 A | 11/1985 | Harrod et al. | |
| 4,563,628 A | 1/1986 | Tietz et al. | |
| 4,631,377 A | 12/1986 | Imazeki et al. | |
| 4,994,940 A | 2/1991 | Thouvenin et al. | |
| 5,187,423 A | 2/1993 | Marton | |
| 5,346,786 A | 9/1994 | Hodgetts | |
| 5,349,535 A | 9/1994 | Gupta | |
| 5,422,198 A | 6/1995 | Lin | |
| 5,479,085 A | 12/1995 | Honda et al. | |
| 5,545,491 A | 8/1996 | Farley | |
| 5,563,493 A | 10/1996 | Matsuda et al. | |
| 5,631,536 A | 5/1997 | Tseng | |
| 5,694,019 A | 12/1997 | Uchida et al. | |
| 5,696,367 A | 12/1997 | Keith | |
| 5,711,648 A | 1/1998 | Hammerslag | |
| 5,773,977 A | 6/1998 | Dougherty | |
| 5,792,573 A | 8/1998 | Pitzen et al. | |
| 5,806,948 A | 9/1998 | Rowan et al. | |
| 5,847,537 A | 12/1998 | Parmley | |
| 5,928,020 A | 7/1999 | Bishop et al. | |
| 5,951,229 A | 9/1999 | Hammerslag | |
| 5,959,368 A | 9/1999 | Kubo et al. | |
| 5,998,963 A | 12/1999 | Aarseth | |
| 6,002,240 A | 12/1999 | McMahan et al. | |
| 6,018,227 A | 1/2000 | Kumar et al. | |
| 6,029,762 A | 2/2000 | Kepner | |
| 6,085,836 A | 7/2000 | Burris et al. | |
| 6,087,806 A | 7/2000 | Fujioka | |
| 6,094,028 A | 7/2000 | Gu | |
| 6,140,798 A | 10/2000 | Krieger | |
| 6,150,823 A | 11/2000 | Takahashi et al. | |
| 6,154,006 A | 11/2000 | Hatanaka | |
| 6,157,162 A | 12/2000 | Hayashi | |
| 6,350,149 B1 | 2/2002 | Nakane | |
| 6,361,897 B1 | 3/2002 | Snyder | |
| 6,445,158 B1 | 9/2002 | Bertness et al. | |
| 6,465,986 B1 | 10/2002 | Haba | |
| 6,498,454 B1 | 12/2002 | Pinlam et al. | |
| 6,631,775 B1 | 10/2003 | Chaney | |
| D483,012 S | 12/2003 | Hsu | |
| 6,773,849 B2 | 8/2004 | Itoh et al. | |
| 6,788,025 B2 | 9/2004 | Bertness et al. | |
| 6,841,293 B1 | 1/2005 | Dreulle et al. | |
| 6,940,254 B2 | 9/2005 | Nagamine | |
| D511,744 S | 11/2005 | Hsu et al. | |
| D512,373 S | 12/2005 | Tsai et al. | |
| D514,060 S | 1/2006 | Wong et al. | |
| D516,020 S | 2/2006 | Wong et al. | |
| D524,728 S | 7/2006 | Watson | |
| 7,157,882 B2 | 1/2007 | Johnson et al. | |
| 7,157,883 B2 | 1/2007 | Johnson et al. | |
| 7,164,257 B2 | 1/2007 | Johnson et al. | |
| D537,408 S | 2/2007 | Aglassinger | |
| 7,176,654 B2 | 2/2007 | Meyer et al. | |
| 7,193,392 B2 | 3/2007 | King et al. | |
| D545,759 S | 7/2007 | Ino et al. | |
| 7,245,108 B2 | 7/2007 | Chertok et al. | |
| 7,253,585 B2 | 8/2007 | Johnson et al. | |
| 7,256,516 B2 | 8/2007 | Buchannan et al. | |
| 7,262,580 B2 | 8/2007 | Meyer et al. | |
| D557,203 S | 12/2007 | Grunow et al. | |
| 7,313,469 B2 | 12/2007 | Wobben | |
| D559,175 S | 1/2008 | Houghton | |
| 7,321,219 B2 | 1/2008 | Meyer et al. | |
| 7,323,847 B2 | 1/2008 | Meyer et al. | |
| D562,228 S | 2/2008 | Okada et al. | |
| 7,327,122 B2 | 2/2008 | Kamenoff | |
| 7,342,381 B2 | 3/2008 | Johnson et al. | |
| D568,239 S | 5/2008 | Okada et al. | |
| 7,378,818 B2 | 5/2008 | Fowler et al. | |
| 7,492,124 B2 | 2/2009 | Johnson et al. | |
| 7,504,804 B2 | 3/2009 | Johnson et al. | |
| 7,507,500 B2 | 3/2009 | Donnelly et al. | |
| 7,508,167 B2 | 3/2009 | Meyer et al. | |
| 7,554,290 B2 | 6/2009 | Johnson et al. | |
| 7,557,535 B2 | 7/2009 | Johnson et al. | |
| D601,088 S | 9/2009 | Scheucher | |
| 7,589,500 B2 | 9/2009 | Johnson et al. | |
| 7,609,027 B2 | 10/2009 | Zick et al. | |
| 2001/0020838 A1 | 9/2001 | Malackowski | |
| 2001/0046624 A1 | 11/2001 | Goto et al. | |
| 2002/0025471 A1 | 2/2002 | Velez | |
| 2002/0096323 A1 | 7/2002 | Burris et al. | |
| 2002/0152476 A1 | 10/2002 | Anderson et al. | |
| 2003/0143455 A1 | 7/2003 | Partington et al. | |
| 2004/0160214 A1 | 8/2004 | Blair et al. | |
| 2000/4201362 | 10/2004 | Borrego Bel et al. | |
| 2005/0017690 A1 | 1/2005 | Kamenoff | |
| 2005/0112457 A1* | 5/2005 | Breen et al. | 429/99 |
| 2006/0012342 A1 | 1/2006 | Kamenoff | |
| 2006/0028167 A1 | 2/2006 | Czubay et al. | |
| 2006/0070555 A1* | 4/2006 | Phillips et al. | 108/55.1 |
| 2006/0077609 A1 | 4/2006 | Bender et al. | |
| 2006/0091849 A1* | 5/2006 | Huynh et al. | 320/112 |
| 2006/0267547 A1 | 11/2006 | Godovich | |
| 2007/0182158 A1 | 8/2007 | Cerney et al. | |
| 2007/0184339 A1 | 8/2007 | Scheucher | |
| 2007/0188130 A1 | 8/2007 | Scheucher | |
| 2007/0188137 A1 | 8/2007 | Scheucher | |
| 2007/0216354 A1* | 9/2007 | Taylor et al. | 320/128 |
| 2007/0247112 A1* | 10/2007 | Yu et al. | 320/112 |
| 2008/0008928 A1 | 1/2008 | Partin et al. | |
| 2008/0008933 A1 | 1/2008 | Lampe-Onnerud et al. | |
| 2008/0053716 A1 | 3/2008 | Scheucher | |
| 2008/0185993 A1 | 8/2008 | Johnson et al. | |
| 2009/0029193 A1 | 1/2009 | Onnerud et al. | |
| 2009/0086043 A1 | 4/2009 | Scheucher | |
| 2009/0087729 A1 | 4/2009 | Johnson et al. | |
| 2009/0153101 A1 | 6/2009 | Meyer et al. | |
| 2009/0181296 A1 | 7/2009 | Lampe-Onnerud et al. | |
| 2009/0195216 A1 | 8/2009 | Johnson et al. | |
| 2009/0197152 A1 | 8/2009 | Johnson et al. | |
| 2013/0053909 A1* | 2/2013 | Elghazzawi et al. | 607/5 |

FOREIGN PATENT DOCUMENTS

| | | | |
|---|---|---|---|
| JP | 404354181 A | | 12/1992 |
| JP | 07059124 A | | 3/1995 |
| JP | 2000030689 A | | 1/2000 |
| JP | 2007033249 A | * | 2/2007 |
| WO | 2007/092955 A2 | | 8/2007 |
| WO | 2007/092955 A3 | | 6/2008 |
| WO | 2009009176 A2 | | 1/2009 |
| WO | 2009009176 ISR A3 | | 3/2009 |

OTHER PUBLICATIONS

Acon, Inc.," MH Series, 100-300W" Oct. 21, 2004, pp. 1-17, www.aconic.com.

CD Media Corporation, "150W DC to AC Power Inverter" 1999-2005, 1 page, http://www.hobbyracer.com/kv-150htm.

National Semiconductor, "LM2936-3.3 Ultra-Low Quiescent Current 3.3V Regulator", Jun. 2002, pp. 1-10. DS101324, National Semiconductor Corporation, www.national.com.

Texas Instruments, "MSP430X15X", SLAS368B, March 2004, pp. 1-64, Texas Instruments, Dallas, Texas.

Transistor Devices, Inc. "2 KW Scaleable Li-Ion AC UPS", Website 0 http://www"1°ler.com/360/uPS/UPS_360.html' 1 page. At least as early as the filed of this application.

Nexergy, "Portable Power Solutions: Designing the Optimal Portable Power System" pp. 1-8, http://www.nexergy.com/pd-Designing_Optimal_PPwr.pdf At least as early as the filing date of this application.

Nass, Richard, "Extending Battery Life" EE Times, Jan. 6, 1997, pp. 1-4, http://www.nexergy.com/extending-battery-life.htm.

Motorola, Inc. MWR7300, 2006, pp. 1-2, Motorola Maitland, Florida 32794-8133,http://www.motorola.com/mesh/pdf/data_sheet_mwr730.Q.pdf.

(56) References Cited

OTHER PUBLICATIONS

Motorola, Inc. VMM7300, 2006, p. 1-2, Motorola Maitland, Florida 32794-8133,http://www.motorola.com/mesh/pdf/data_sheet_vmm7300.pdf.
McDowell Research, MRC-34, 2 pages, Website, http://www.mcdowellresearch.com/Datasheet.php?ID=M RC-34, 2007.
McDowell Research, Briefcase Power System, 1 page, Website, http://www.mcdowellresearch.com/subcategory.php?ID=21, 2007.
Automated Business Power, Uninterruptible Power Supply for Javelin CLU, 1 page, Website, http://www.abpco.com/Uninterruptible_Power_SupplLJAVELIN_CLU.shtml, 2007.
Automated Business Power, Uninterruptible Power Transceiver Power Unit Applications, 2 pages, Website, http://www.abpco.com/Uninterruptible_Power_Supply_Transceiver_Battery_Eliminator_App.shtml, 2007.
Automated Business Power, Uninterruptible Power Supply Transceiver Battery Eliminator Applications, 2 pages Website, http://www.ABPCO.com/Uninterruptible_Power_Transceiver_Battery_Eliminator_App.shtml, 2005
Motorola, Inc. WMC7300, 2006, pp. 1-2, Maitland, Florida 32794-8133, http://www.motorola.com/mesh/pdf/data_sheet_wmc7300.pdf.
Motorola, Inc. IAP 7300, 2006, pp. 1-2, www.motorola.com/mesh, Maitland, Florida 32794-8133, http://www.motorola. com/mesh/pdf/data_sheet_iap7300.pdf.
International Rectifier, IRF7240 HEXFET Power MOSFET, Mar. 6, 2001, IR World Headquarters: 233 Kansas St., El Segundo, California 90245, www.irf.com.
Diodes Incorporated, PDS1040CTL, Diodes Incorporated. pp. 1-3, www.diodes.com At least as early as the filed.
Panasonic, Multilayer Chip NTC Thermistors, pp. 1-4, At least as early as the filed of this application.
Kerchner, George A. "Battery Power Online" 2001, Webcom Communications Corp. http://www.batterypoweronline.com/july02Li-IonRegulations.htm.
U.S. Appl. No. 60/951,669; FID: Jul. 24, 2007; Inventor Name: Toby Thomas.
U.S. Appl. No. 60/909,873; FID: Apr. 3, 2007; Inventor Name: David L. Hoelscher, 28 pages.
U.S. Appl. No. 60/911,564; FID: Apr. 13, 2007; Inventor Name: Karl Scheucher.
U.S. Appl. No. 29/280,875; FID: Jun. 8, 2007; Inventor Name: Karl Scheucher.
U.S. Appl. No. 60/952,240; FID: Jul. 26, 2007; Inventor Name: Karl Scheucher.
U.S. Appl. No. 29/266,852; FID: Sep. 29, 2006; Inventor Name: Karl Scheucher.
U.S. Appl. No. 60/771,771; FID: Feb. 9, 2006; Inventor Name: Karl Scheucher.
U.S. Appl. No. 60/781,959; FID: Mar. 12, 2006; Inventor Name: Karl Scheucher.
U.S. Appl. No. 60/855,958; FID: Nov. 1, 2006; Inventor Name: Karl Scheucher.
U.S. Appl. No. 60/857,079; FID: Nov. 6, 2006; Inventor Name: Karl Scheucher.
Watson, R.L. et al; "Refueling Infrastructure for an All-Electric Car Fleet"; Transport and Road Research Laboratory; Research Report 66; 1986; 34 pages; ISSN 0266-5247; Hobbs the Printers of Southampton, UK.
Meissner, E. et al. "Battery Monitoring and Electrical Energy Management Precondition for future vehicle electric power systems". Journal of Power Sources; 2003; pp. 79-98; 116; Elsevier Science B.V., Amsterdam 1043, NX.
Santhanagopalan, S. et al. "Online Estimation of the state of charge of a lithium ion cell", Journal of Power Sources; Jun. 19, 2006; pp. 1346-1355; 161; Elsevier Science B.V., Amsterdam 1043, NX.
Plett, G. L. "Extended Kalman filtering for battery management systems of LiPB-based HEV battery packs". Journal of Power Sources; Jun. 9, 2004; pp. 252-292; Elsevier Science B.V., Amsterdam 1043, NX.
U.S. Appl. No. 60/848,148; FID: Sep. 29, 2006; Inventor Name: Karl Scheucher.

\* cited by examiner

BATTERY PACK SAFETY AND THERMAL MANAGEMENT APPARATUS AND METHOD

This application is a divisional of parent application Ser. No. 12/102,012 filed Apr. 13, 2008, now U.S. Pat. No. 8,084,154. This divisional application claims priority to, and the benefit of, the filing date of parent application Ser. No. 12/102,012 filed Apr. 13, 2008, now U.S. Pat. No. 8,084,154. application Ser. No. 12/102,012 filed Apr. 13, 2008, now U.S. Pat. No. 8,084,154, is incorporated herein in its entirety by reference hereto. This patent application claims priority to U.S. Provisional Patent Application Ser. No. 60/911,564 filed Apr. 13, 2007 and is a continuation-in part of U.S. patent application Ser. No. 11/672,853 filed Feb. 8, 2007, now U.S. Pat. No. 8,026,698, Ser. No. 11/672,957 filed Feb. 8, 2007, Ser. No. 11/673,551 filed Feb. 9, 2007, now U.S. Pat. No. 7,838,142, and Ser. No. 11/851,504 filed Sep. 7, 2007, now U.S. Pat No. 7,948,207. U.S. Provisional Patent Application Ser. No. 60/911,564 filed Apr. 13, 2007 and U.S. patent application Ser. No. 11/672,853, filed Feb. 8, 2007, now U.S. Pat. No. 8,026,698, Ser. No. 11/672,957 filed Feb. 8, 2007, Ser. No. 11/673,551 filed Feb. 9, 2007, now U.S. Pat. No. 7,838, 142, and Ser. No. 11/851,504 filed Sep. 7, 2007, now U.S. Pat. No. 7,948,207, are incorporated herein by reference thereto the same as having been copied verbatim into the instant patent application. U.S. Provisional Patent Application Ser. No. 60/911,564 filed Apr. 13, 2007, U.S. patent application Ser. No. 11/672,853 filed Feb. 8, 2007, now U.S. Pat. No. 8,026,698, Ser. No. 11/672,957 filed Feb. 8, 2007, Ser. No. 11/673,551 filed Feb. 9, 2007, now U.S. Pat. No. 7,838,142, and Ser. No. 11/851,504 filed Sep. 7, 2007, now U.S. Pat. No. 7,948,207, all have the same inventor.

FIELD OF THE INVENTION

The field of invention is in the field of intelligent, electronically managed battery rechargeable battery packs having a variety of safety and operating temperature constraints in application.

BACKGROUND OF THE INVENTION

Velez et. al., U.S. Patent Publication No. US 20020025471A1 discloses a heater for a thermal battery whose chemistry is actually disabled at lower temperature and becomes active at higher temperature, the heater preferably implemented as wire wound around the cell. Kamenoff, U.S. Patent Publication Nos. US 20050017690 and 20060012342 and U.S. Pat. No. 7,327,122, describe a heater for the purpose of discharging a battery more efficiently.

SUMMARY OF THE INVENTION

The present invention is an elegant solution to achieving the economical and safe shipping and handling of electrical apparatuses comprising large amounts (quantities) of lithium ion batteries. Regulation of the transportation of hazardous materials (49 CFR. 173.185 and United Nations ST/SG/AC.10/C.3/2005/43 for example) stipulate procedures and limitations for lithium ion battery cells and packs (batteries or packs hereinafter). These regulations divide (separate out) hazardous class 9 from exempted non-hazardous material based upon a threshold of 8 grams aggregate equivalent lithium content. The equivalent lithium content is calculated based upon the electrical capacity of the battery, the capacity being measured in units of charge such as amp-hours (Ah). The equivalency factor has been set by regulation at 0.3 grams equivalent lithium per amp-hour capacity. Thus a battery having 8 equivalent grams lithium divided by 0.3 equivalent grams per AH capacity would have a charge capacity of 26.7 Amp-hour. Batteries with 26.7 Amp-hour capacity or less are exempt from the hazardous materials requirements. Batteries with more than 26.7 Amp-hour are classified as hazardous for the sake of transportation regulation.

The current invention considers batteries and packs that approach but do not exceed this hazardous material classification threshold. One such pack contemplated in the invention comprises twelve (12), 2.15 Amp-hour lithium ion battery cells arranged in a two (2) parallel six (6) series configuration (6S2P configuration). The aggregate charge capacity of this twelve (12)-cell battery pack is simply computed as twelve (12) (cells)/(battery pack) times (2.15 Amp-hours)/(cell) 25.8 Amp-hour/battery pack. According to the regulations, therefore, the battery pack contains 25.8 Amp-hours times 0.3 grams per Amp-hour which equals 7.74 grams equivalent lithium, which is less than the hazardous material threshold of 8 grams aggregate. The battery pack so designed and disclosed herein is exempt from hazardous material transportation regulations. This exemption is advantageous for reasons including ease of handling and shipping via commercial air transport as well as inherently safer storage, transport, and operation in general.

If the government regulations change the instant invention can accommodate the change. For instance, if the 8 grams aggregate equivalent lithium content should change, the instant invention can be reprogrammed to account for the change.

The present invention discloses a battery powered system comprising a microcontroller, an external controller and plurality of battery packs wherein the controllers communicate battery pack and other information therebetween. Each of the battery packs comprises one or more battery cells, a pack positive and a pack negative electrical contact, a fuse, and a fuse receptacle or connector. The fuse and fuse receptacle are series between the battery cells and the battery pack positive electrical connector. Alternatively, the fuse and fuse receptacle is in series between the battery cells and the pack negative electrical connector. A microcontroller or other logic system is capable of detecting whether or not the fuse is installed into the receptacle and is capable of communicating information (including fuse presence) with an external controller. The microcontroller and the external controller also exchange information which includes the amount of hazardous material (equivalent lithium ion content) contained in the battery pack.

The present invention discloses a battery pack comprising one or more battery cells, a heater, a microcontroller or other logic system for controlling the heater by switchably interconnecting the heater to a power source with the switch being under the control of the microcontroller or other logic system and switchably connecting the power source to the heater. The power source may be the battery cells within the battery pack or an external source such as a battery charger, external battery or power supply. A temperature sensor measures the battery pack temperature and communicates with the microcontroller or other logic system. The microcontroller or other logic system interrogates the temperature sensor periodically and controls a first time during which said switch is closed and power is applied to the heater, and a second time during which the switch is open and power is removed from the heater.

A process of determining the hazardous status of a system comprising a plurality of battery packs for compliance with safety transportation safety and regulation purposes, includes the steps of communicating with each battery pack in the system and determining the amount of hazardous material in each battery pack. The electrical connectivity of each pack with respect to all the other packs is determined. Groups with each group consisting of all battery packs electrically connected with one another are defined and the amount of hazardous, material in the battery packs of each group of electrically connected packs is summed (added). The group or groups having the greatest sum (largest amount) of hazardous material are determined and compared to a threshold value thus determining the hazardous status.

A process of controlling the temperature of a battery pack includes the steps of determining the operating mode and present temperature of the battery pack. Optimal temperature for the battery pack depends on the operating mode and the difference between the present temperature and the previously identified optimal temperature. The battery pack is warmed if the temperature difference (measured minus optimal) is large. The optimal time interval over which the battery pack should be warmed is a function of the operating mode and the previously calculated temperature difference. A heater is switchably operated enabling and disabling the heat generating element to warm the pack to the previously identified optimal temperature.

It is an object of the present invention to provide a method for interrogating a battery pack or a group of battery packs to determine the amount of hazardous material therein.

It is an object of the present invention to provide a safe method of transportation of systems containing lithium ion batteries.

It is an object of the present invention to provide a fuse which is readily accessible on the front of the battery pack which enables operation of the pack when the fuse is inserted and disables operation of the pack when the fuse is removed.

It is an object of the present invention to provide a battery pack heater wherein printed circuit boards contain resistive heating traces thereon.

It is an object of the present invention to provide a battery pack heater controlled by a controller which senses battery temperature, determines an optimal temperature and applies a heating algorithm for achieving the optimal battery temperature.

It is an object of the present invention to provide a battery pack heater which is switchably connected to a power supply which may be an internal power supply or an external power supply.

It is an object of the present invention to provide a battery pack heater wherein a microcontroller switchably innerconnects the power supply to resistive heat traces on the printed circuit boards.

These and further objects of the invention will be best when reference is made to the remainder of this patent application.

The drawings will be better understood when reference is made to the remainder of the application.

DESCRIPTION OF THE INVENTION

Figure 1:
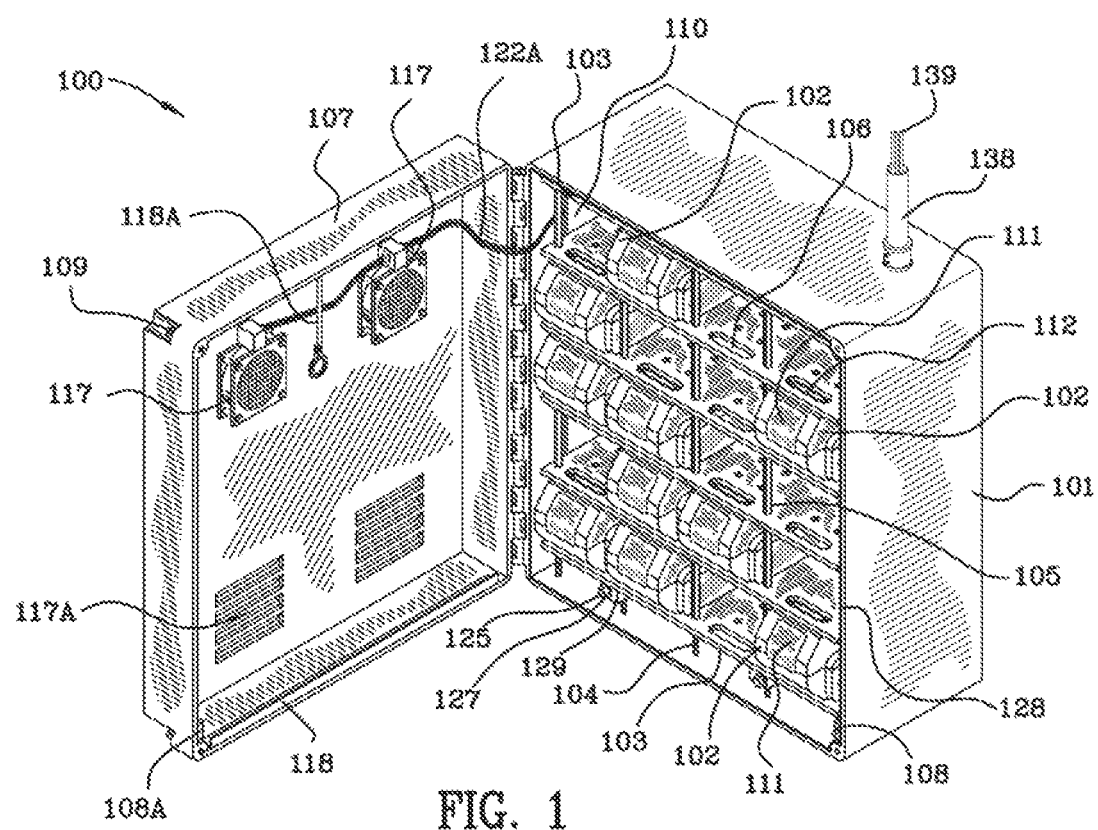
FIG. 1 is a perspective view of a power supply apparatus containing a plurality of battery packs.

The invention specifically contemplates applications using a plurality of battery packs assembled into a single apparatus. FIG. 1 depicts such an apparatus having a plurality of battery packs 102. Further, these co-resident packs are electrically connected with one another in series, parallel, or series-parallel configurations. Under these circumstances, the aggregate lithium content is calculated by adding the equivalent lithium content of all of the packs that are electrically connected in common. For example, suppose two of the above-described packs having 7.74 grams equivalent lithium each are connected in parallel. The aggregate lithium content of the device considered as a whole will be 2×7.74 grams or 15.48 grams, more than the 8 gram limit. The apparatus would therefore be considered hazardous (non-exempt) material requiring special treatment as such under the previously described hazardous materials regulations. This imparts greater cost and various limitations to the device and its usage.

The present invention utilizes battery packs which are of the quick-connect cartridge type 102 (battery packs hereinafter), the differentiating feature of such packs being an electrical and mechanical connection scheme that is quickly, easily, and simultaneously engaged and disengaged without the use of tools. See the pack in FIG. 2.

The present invention addresses the economical and safe electrical disconnection of battery packs while they are in place within an enclosure or other structure. This feature of the invention allows the enclosure which contains battery packs whose aggregate equivalent lithium content in sum would render the apparatus hazardous to remain exempt (non-hazardous) even while the packs remain removably affixed within the enclosure or apparatus. The alternative approach of removing the packs both electrically and mechanically separating them from one another is not desirable as it leads to additional packaging volume and complexity thus burdening handling and transportation processes.

The essence of this aspect of the invention includes using a switch or removable link, located to be easily accessed while the battery pack remains plugged in place, to electrically disconnect the pack. The switch or removable link is electrically in series with the battery cells and either the pack's negative quick connector, the positive quick connector, or both. In the case of a switch, the switch maybe operated to the open state to effect the electrical, disconnection. In the case of a removable link, the link is unplugged from its mating location in the pack thus opening the circuit. In either case, reconnecting the pack is simply a matter of reversing the disconnection operation, for example, changing the state of a switch or in the case of a fuse, reinserting the fuse.

In the case of a switch, a toggle switch, slide switch, rocker switch, pushbutton switch or other applicable switch variant, is contemplated. A switchable circuit breaker is also contemplated and may be used to provide not only the switching function but also the advantageous additional function of providing over current shutdown protection whenever the switch is in the connected, operating state.

Figure 6:
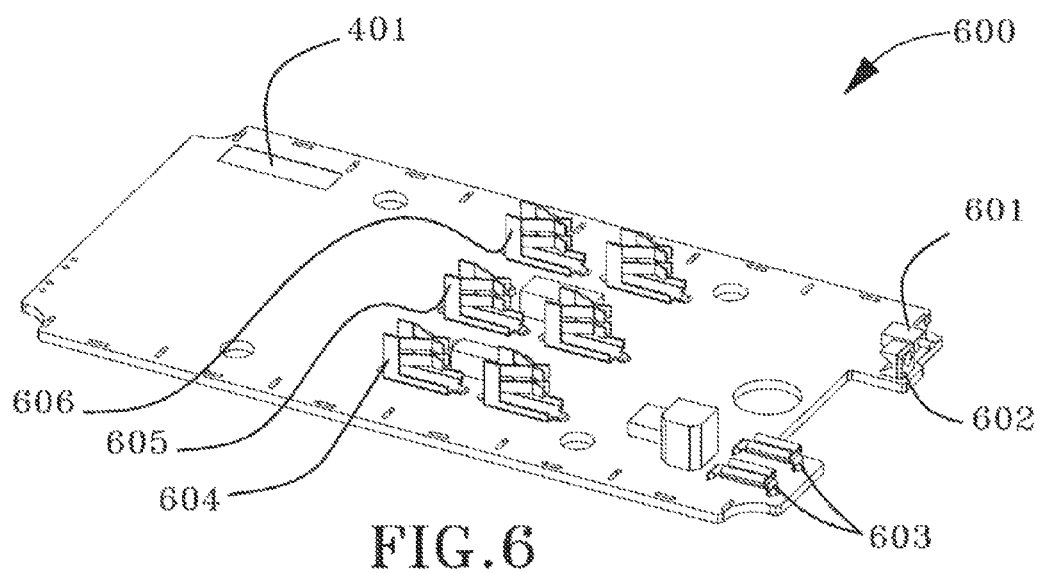
FIG. 6 shows the fuse receptacle of the control module.

In the case of a removable link, a shaped, conductive element is contemplated including a simple segment of round or other shaped conductive wire. The present invention specifically contemplates using a fuse 205, the fuse being any one of many readily accepted and available commercial varieties including automotive blade type, round glass type, screw-in, and various other snap in, quickly removable fuse types, fuse 205 in FIG. 2 being but one example. The unplugging and re-plugging of the fuse in a mating socket or holder 603 of the pack as shown in FIG. 6 achieves the disconnection and re-connection functions respectively. As with the circuit breaker variant of the switch, the fuse variant of the removable link has the additional advantage of providing over current shutdown protection while plugged in and operating. A further advantage is that, unlike a switch, there is little or no danger of the accidental re-connection of the circuit during transport. With a switch, this accidental reconnection could occur if the switch is accidentally actuated as a result of mechanical shock, vibration, or inadvertent actuation of any sort.

Figure 11:
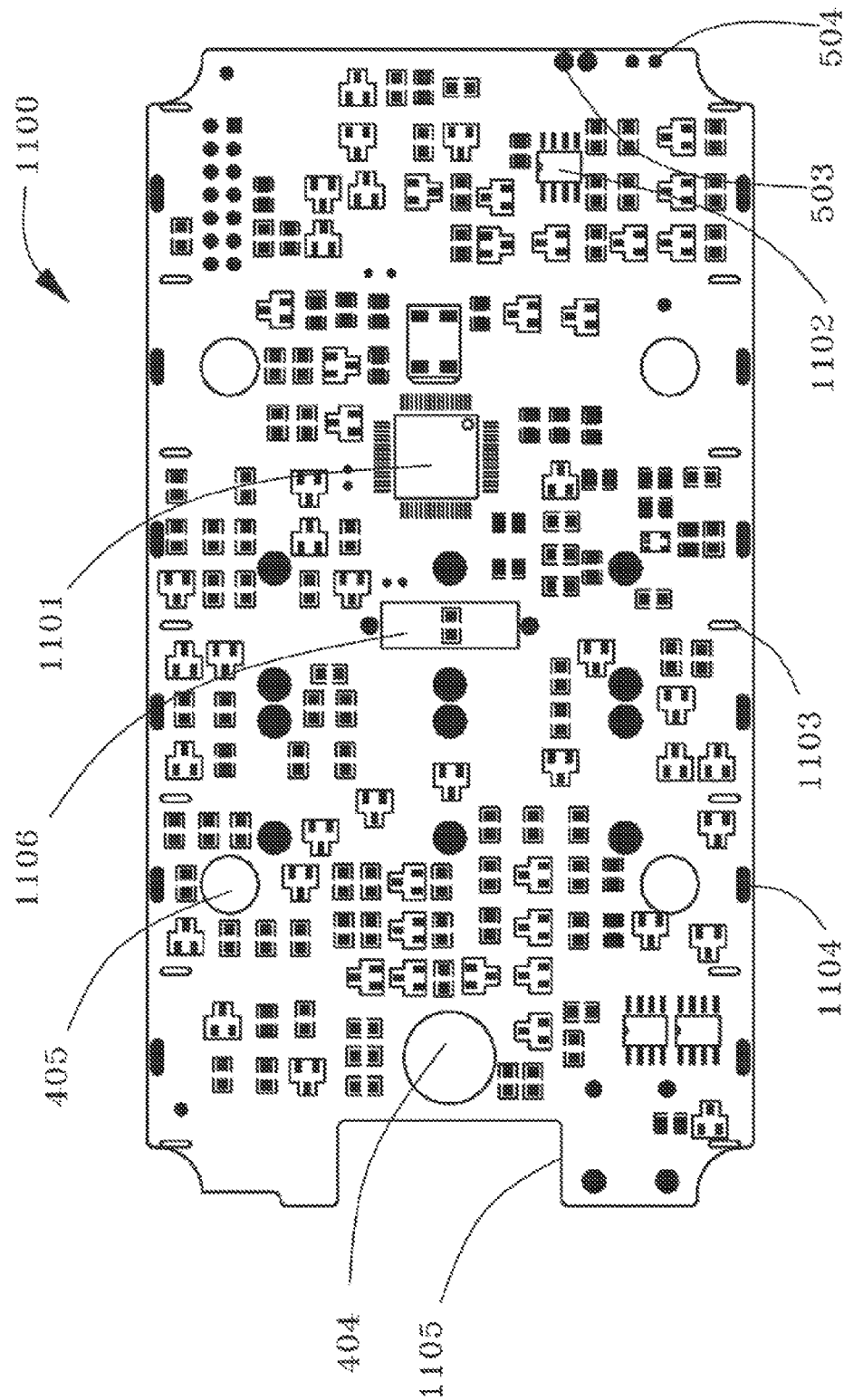
FIG. 11 is a drawing of one side of the control module printed circuit board wherein the microcontroller, the heater electronic switch, and the thermistor connections are shown.

The present invention specifically includes intelligent battery packs incorporating microcontrollers 1101 or other logic circuitry as exemplified by the printed circuit board shown in FIG. 11, the controller being capable of monitoring pack operating status and communicating the status information to other control elements within the system in which it resides, for example, with a main controller in the encompassing apparatus. Importantly, the battery pack controller is capable of determining the state of its electrical connectivity, i.e., whether the switch (removable link) controlling the electrical connectivity is in the open (removed) or closed (installed) state. A further important aspect of the invention is the ability of the controller to communicate the electrical connectivity state information to an external or master controller within the apparatus encompassing the battery pack. These features in combination allow the master controller to acquire the electrical connectivity status of all battery packs within its control scope, to compute the worst case equivalent lithium (or other hazardous material) content based upon the largest group of packs found to exist in common electrical connection, to compare the worst case equivalent lithium content to a threshold such as the aforementioned 8 gram (or other amount or limit) threshold, and to determine based upon the comparison whether the apparatus exists in an exempt (non-hazardous) or hazardous state or condition. Personnel can be notified by display or other mechanism of this latter determination and, if a hazardous status (state or condition) exists, the personnel may take further actions to alleviate the hazardous condition or to implement special handling procedures for transport.

Another aspect of the present invention includes incorporating a heater 905, 907, 1304 and associated control circuitry into a battery pack to augment the environmental and other operating capabilities of the pack.

Often the predominant goal in battery pack design and applications is to maintain low pack temperatures to maximize the safety and life span of the batteries in cold environments, however, the complementary goat, maintaining sufficiently high pack temperatures, may predominate. Many types of batteries are often limited to a minimum temperature below they may not be safely or efficiently charged or discharged. In applications where low temperatures prevail, heating rather than cooling of battery packs may be required for efficient and sale operation.

A heating element 905, 907 for general use may be formed from an electrically resistive element or resistor. The heater dissipates heat during the flow of electric current therein in an amount proportional to the power in the heater which in turn s equal to the square of the magnitude of the electrical current multiplied by the resistance of the heater. The dissipated power will be in units of watts, electrical current is in units of Amps and the resistance is in units of Ohms.

Figure 9:
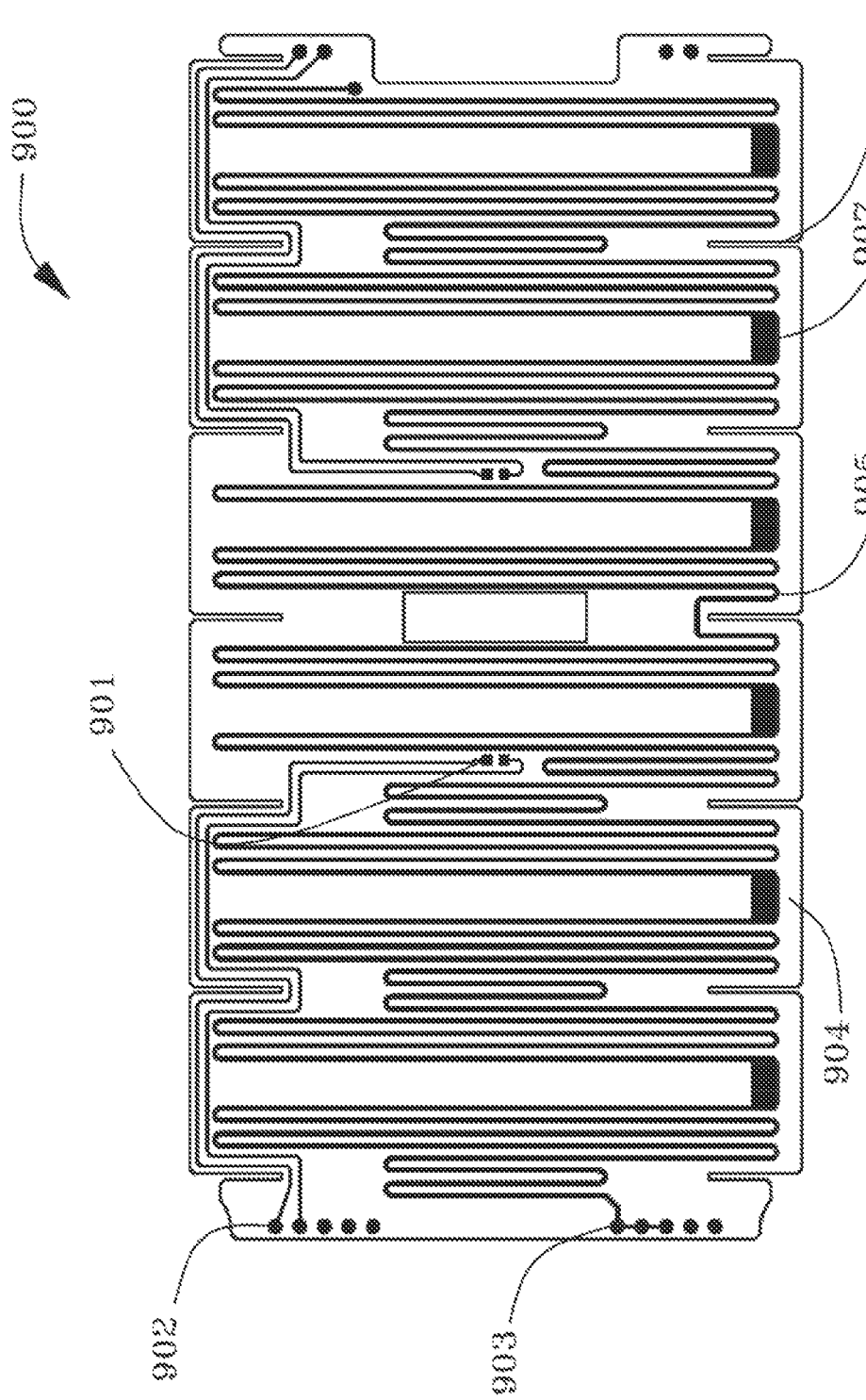
FIG. 9 is a drawing of one side of a heater element printed circuit board.
Figure 10:
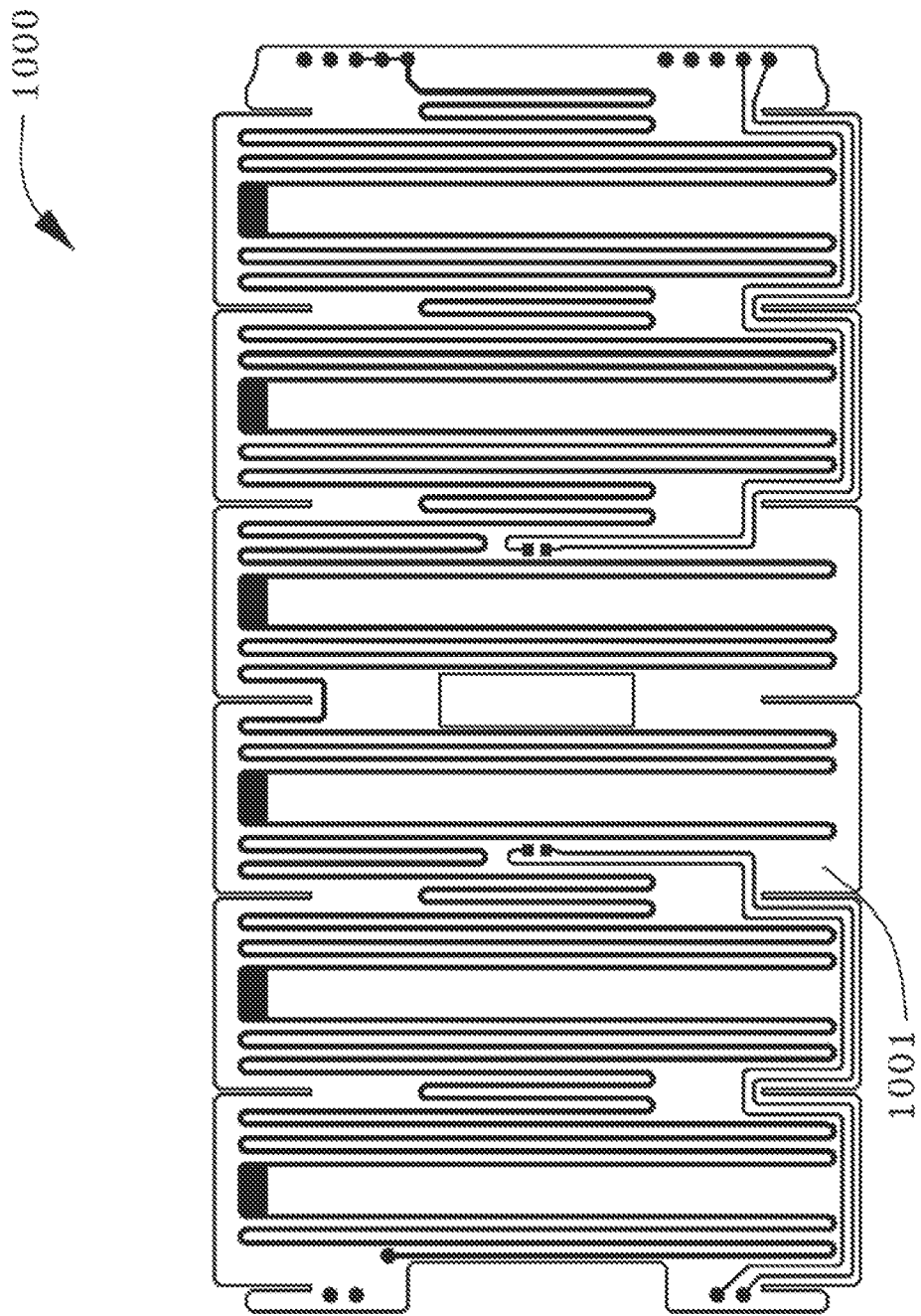
FIG. 10 is a drawing of the other side of a heater element printed circuit board.

The present invention includes fabricating a resistive element for use as a heater using a carefully controlled layout of copper traces on a printed circuit board as depicted in FIGS. 9 and 10. The resistance of the trace work on a printed circuit board so designed is controlled by the trace material and geometry. The trace resistance is affected by the electrical resistivity of the trace material expressed in units of ohms times unit length, e.g., ohms-centimeters.

Applicable trace materials include copper typically (resistivity of approximately $1.7 \times 10^{-6}$ ohm-cm) but may also include any type of conductive material such as carbon graphite (resistivity of approximately $1 \times 10^{-3}$ ohm-cm), gold (resistivity approximately $2.4 \times 10^{-6}$ ohm-cm), etc. For a given material, the resistance will be further determined by the trace geometry, the resistance being inversely proportional to the cross section of the trace and proportional to the length of the trace. Larger cross section (thickness times width) results in less resistance. Longer trace length results in greater resistance. The total resistance of the traces in the printed circuit board(s) may be estimated my multiplying the trace material resistivity by the total trace length and dividing by the average trace cross sectional area. For example, a printed circuit board having a copper trace 725 cm in length with a trace width of 0.05 cm and a trace thickness of 0.005 cm would conduct with a resistance of approximately 5 ohms. If a potential of 12 V were applied to the trace, a current of 12 V/5 ohms equals 2.4 Amps would flow. The power dissipated in the trace under these conditions would be 2.4 Amps squared multiplied by 5 ohms or approximately 29 Watts. In FIG. 9, reference numeral 907 points to a fatter or wider part of the heater trace work. The fat or wide trace is located where the cylindrical battery cells touch the heater PCB. As explained above, the power dissipated in the trace work and therefore the temperature of the trace work is proportional to the resistance of the trace work which in turn is inversely proportional to the width of the trace work. For example, the trace work gets hottest where it is narrow at 905 removed from the cell contact point and, ignoring thermal conduction in the copper for the moment, stays cooler where it is fattest at 907 and in contact with the cell thus protecting against over-heating the cell insulating material at the point of contact.

One or More printed circuit boards may be connected in parallel or series configurations to achieve almost any desired resistance in almost any mechanical form factor. The shape and size or printed circuit boards to be used in a pack heater application will be dictated by the geometry of the pack, the space available within the pack and the locations within the pack where the production of heat is desired. The resistance of the traces will be dictated by the anticipated voltage to be applied and by the peak or Maximum power dissipation desired or allowed.

Several electrical energy sources may be utilized for heating including the batteries themselves (internal source) and external sources such as battery chargers, other batteries, or power supplies. The present invention includes the use of either internal, external, or both types of sources in any combination.

The application of electrical energy to the heating resistances may be constant or intermittently switched. In the constant case, a switching element is controlled to be either in the off (not heating) state, or in the on (heating) state. When in the on state, the heating is proportional to the relatively constant power dissipation which is in turn equal to the current squared times the heater resistance as demonstrated above. In the case where the applied voltage is known, this power level is equally well calculated as equal to the applied voltage squared divided by the resistance.

The intermittently switched case uses the well-known technique of Pulse Width Modulation (PWM) to control the average power dissipated in the heater and therefore the average heat generation. The electrical supply to the heater is switched on for a first time period then switched off for a second time period. This on-off pattern is repeated indefinitely to the effect that the duty cycle or percentage on time becomes equal to the ratio of the on time divided by the total time (on plus off time). For example, if the switch is on for 1 ms and off for 2 ms, the duty cycle is equal to 1 divided by (1 plus 2) equals 1 divided by 3 or ⅓. The average current is therefore the on current multiplied by the duty cycle. For example, if the "on" current is 2 Amps, the average current with ⅓ duty cycle will be ⅔ Amps. The average power dissipation is as before the square of the average current multiplied by the resistance of the heater. Any level of power may be achieved up to the maximum possible given the applied voltage and the heater resistance by varying the duty cycle between zero and unity, equivalently varying the on time between zero and always on.

The present invention utilizes a battery pack incorporating a microcontroller or other logic system (controller) and an electronic switch such as a field effect transistor 1102 as shown located in FIG. 11 or other type switch enabling or disabling electrical power to be applied to the heater. Further, the controller can control the electronic or other switch energizing or de-energizing a heater in either the constant or intermittently switched modes.

The invention herein further utilizes the measurement of the temperature of the battery pack by means of an electronic or other type of temperature sensing element such as a thermistor 901 which can be located as shown in FIGS. 9 and 10, thermocouple, platinum RTD, or silicon junction based sensor. The aforementioned controller is envisioned to determine the pack temperature by interfacing with this sensor.

The controller may utilize the aforementioned temperature information in its operation of the heater switch. The way in which temperature information is utilized includes a thermostatic control mode wherein the heater switch is operated in a way to achieve and maintain a target temperature.

The controller may operate the heater according to more complex algorithms in various situations. Consider a scenario where the battery is used to operate a load for a period of time in cold temperature. As the battery nears complete discharge it must be detached from the load and recharged. After recharging is complete the battery must again be returned to its role operating the load. This pattern repeats ad infinitum. Assume the preceding proceeds in a cold environment, e.g., −30 degrees centigrade. Further assume that the temperature of the battery must be raised to a minimum of 0 degrees centigrade before recharging can begin and proceed safety and efficiently. The battery utilization duty cycle includes the time the battery is operating the load (top, operation time); the time in transit from the load to the charger (ttrans, transit time), the time the battery is warming to begin recharging (twarm, warming time), the recharging time (tcharge, charging time), and the time in transit from the charger hack to the load (ttrans, transit time again). The total cycle time is the sum of the above times, ttotal=top+ttrans+twarm+tcharge+ttrans. The operating duty cycle is simply the time operating divided by the total time, top/ttotal. The warming time may be quite significant, perhaps as long or longer than the operating time, in the absence of internal heating. Put another way, internal heating in direct proximity to the battery cells may be the most efficient means of quickly and uniformly warming the cells throughout a pack.

A pack equipped with a controller, temperature sensor, and switch controlled heater described above may implement an algorithm to maximize the operating duty cycle follows: When the pack is operating and approaching the point of becoming discharged, its controller may divert energy to the heater to begin warming. This will shorten the operating time somewhat. The controller will continue to apply any remaining energy to the heater during transit time to the charger further warming the cells. Once placed on charge, the controller will divert initial charge energy as required to the heater to complete warming of the batteries. As the pack becomes sufficiently warm to accept initial charge current, the controller will begin diverting an increasing amount of charge energy to charging the batteries correspondingly decreasing the energy diverted. to the heater. When completely warm the controller will apply all charge energy to recharging the batteries. All of the independent variables mentioned in the above algorithm may be varied to the effect that the operating duty cycle is optimized under every conceivable condition and situation. Although the operating time may be slightly shortened by using some battery energy for heating, the corresponding decrease in warming time may yield a great gain in operating duty cycle. For example assume, in the absence of the above algorithm, the operating time is 4 hours, the transit time is 10 minutes, the warming time is 90 minutes, the charging time is 2 hours, and the return transit time is 10 minutes. Thus the operating duty cycle is 240/470 or about 51%. Applying the above-mentioned heating algorithm, the scenario times may be changed as follows: operating time is 230 minutes (1.0 minutes shorter since 10 minutes of energy will be used for warming in transit), transit time 10 minutes, warming time 10 minutes, charging time 2 hours, and return transit time 10 minutes. The operating duty cycle is now 230/380 or 60.5%. The improvement is due to the warming time being reduced from 90 to 20 minutes, 10 minutes of which are overlapped with the first transit time using the energy from the foreshortened operating time. The second 10 minutes of warming proceed with energy sourced from the charger.

The pack controller may also deploy the heater to preheat the pack prior to discharge operation in certain cold circumstances. It is generally known that battery internal resistance increases with decreasing temperature. Under certain circumstances, the battery resistance when first connected to the load may be so high that the current available at the voltage needed to operate the load is insufficient. In such cases it may be desirable or necessary to preheat the batteries prior to connecting the pack to the load. The decision to begin preheating the pack may be undertaken automatically by the controller based upon time and temperature. Alternatively, the user may signal that connection is imminent by pressing a button on the pack, the button being another element of the present invention, and the controller receiving the signal may decide how best to preheat the pack depending upon the temperature and the anticipated load once connected. The latter parameter, the anticipated load, may be learned by the pack controller over several cycles of operation by measuring and logging the actual load applied. The degree of preheating then is controlled to raise the pack temperature to the point where the battery internal resistance has decreased sufficiently to allow the anticipated load to be sufficiently supplied immediately when the pack is connected to the load. Alternatively, the pack may be preprogrammed to heat to a particular temperature regardless of the anticipated load. Many variations of the algorithm are possible given that the controller has the heater, the heater control switch, the measured temperature, a push-button user interface, and the energy in the batteries themselves at its disposal.

FIG. 1 is a front perspective view 100 of the intelligent power supply device illustrating a plurality of removable cartridge energy packs 102 in a rack residing in an enclosure 101. Referring again to FIG. 1 the rack is not fully populated with batteries. The removable cartridge energy packs 102 are preferably batteries and those shown are representative of a nominal 18 VDC Li-Ion cordless tool battery manufactured and sold by Makita®. Makita® is believed to be a trademark of Makita Corporation of Anjo-shi, Aichi-ken, Japan. Any type of battery may be used but Li-ion (lithium ion), NiMH (Nickel Metal Hydride), NiCd (Nickel Cadmium), Li-ion polymer, lead acid or alkaline batteries are presently contemplated. Li-ion is one preferable choice because of its gravimetric (energy per unit mass/weight) and volumetric (energy per unit volume) efficiencies.

Referring, again to FIG. 1, a partially populated rack is illustrated to demonstrate that the power supply device will operate with at least one back-up battery 102. The batteries 102 may be removed at any time even while they are in operation and even while the power supply device is in operation. This is known as being hot swappable. Reference numeral 110 indicates a printed circuit board which contains battery interface circuits thereon. Alternatively, the printed battery interface circuit board may be attached to the rack through the use of adhesives or by interlocking aspects of the circuit board and the shelves or rack implementing a "snap together" construction.

Referring to FIG. 1, shelves 103 are adapted to receive the Makita® 18 VDC Li-Ion batteries 102. The batteries of the instant invention are illustrated and shown in FIGS. 2-15. The batteries shown and described in FIGS. 2-15 are useable in place of the Makita batteries illustrated in FIG. 1. FIG. 1 shows by way of example one such enclosure or apparatus which may house the batteries shown and described in FIGS. 2-15.

Shelves 103 may be made of an electrical insulator such as polycarbonate. Recesses 106 receive spring loaded locks 111, 112. In the case of the battery of the instant invention, pack latch mechanism 203 would interengage the recesses 106. Parts labeled 111, 112 are integral such that as button 111 is depressed downwardly. Parts labeled 112 recedes into the battery pack enabling insertion and withdrawal into the rack. In this way tongue 112 engages the recess 106 of each shell 103 and securely positions the battery into place such that it cannot be removed even if the enclosure 101 is accidentally or purposefully knocked over or subject to such shock and vibration as is typically present in vehicle, aircraft, vessel, or spacecraft born applications.

Still referring to FIG. 1, front door portion 107 is shown in the open position exposing the interior of the enclosure 101 and the interior of the door. Door 107 can be securely locked and padlocked to protect the power supply device through known means. A threaded screw 109 is illustrated as one way to secure the closure of the door.

Door 107 includes vents 1117A which allow ventilation of the interior of the enclosure when door 107 is closed. Filters may be placed over vents 117A to protect from the intrusion of unwanted dust, debris, insects or other foreign matters. Fans 117 located in the upper portion of the door 107 expel warmer air from the device creating negative pressure thus drawing cooler air in through vents 1117A. Duct or baffling elements (not shown) can be included to the effect of directing cooler air entering via vents 117A first beneath battery rack lower shelf 103 wherefrom it flows upward across a motherboard (not shown) before traversing over top of the uppermost shelf and exiting via fans 117. In this way cooling of power conversion elements and other electronic and electrical elements housed on the motherboard is efficiently accomplished. Operation of the fans 117 may be controlled by a master controller based upon various temperature measurements. Wire harness 122A powers fans 117.

Still referring to FIG. 1, lip 118 is affixed to door 107 and is used to temporarily store the battery rack. Loop 118A is used in conjunction with one of the threaded interconnecting rods 104 to secure the rack in the door. Lip 118 secures another of the threaded interconnecting rods 104. Door open sensor 108 interacts with block 108A on door 107 to sense the position of the door.

Still referring to FIG. 1, wires 139 are illustrated in conduit 138 interconnecting with enclosure 101. Wires 139 include AC and DC inputs and outputs and communication lines.

Still referring to FIG. 1, shelves 103 include apertures 106 into which spring loaded locks 111, 112 of removable cartridge energy packs (batteries) 102 fit. Front door portion 107 engages gasket 128 when the door is closed. Fans 117 and vents 117A provide ventilation to the enclosure. Threaded screw 109 ensures that the door remains closed. Connecting rods 1104 and 125 support the shelves. Tube spacers 105 provide for the vertical spacing of the shelves 103. Nuts 127 and fastening bars 129 secure connecting rods 125 which extend from fasteners (not shown) on the back of the cabinet.

Figure 2:
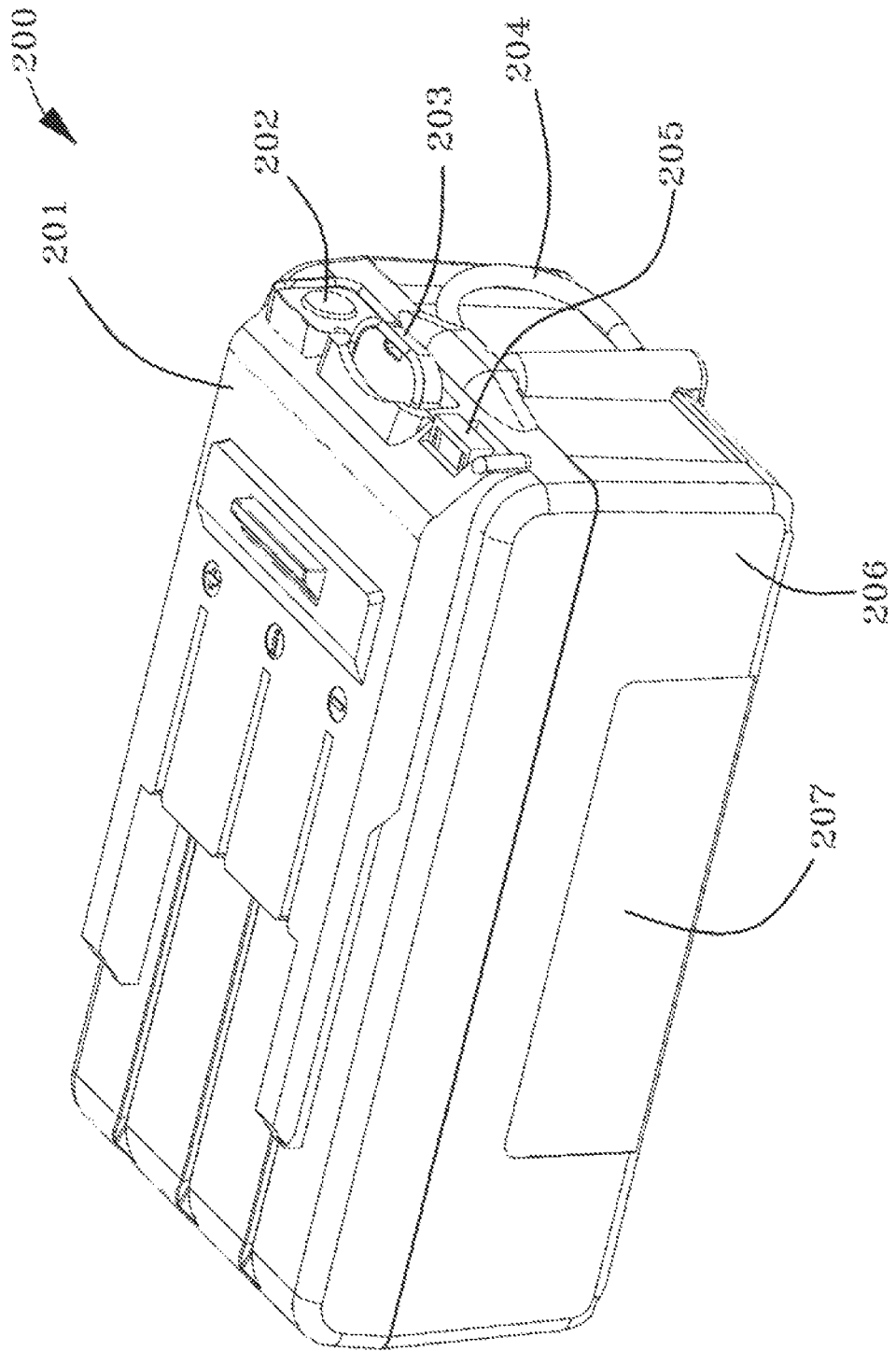
FIG. 2 is a perspective view of a quick-connect cartridge type battery pack having electrical and mechanical connections which quickly, easily, and simultaneously engage and disengage the enclosure.

FIG. 2 is a perspective view of the quick-connect intelligent, fused, heated cartridge type battery pack having electrical and mechanical connections which quickly, easily, and simultaneously engage and disengage the enclosure without the use of tools. Pack upper housing 201 and pack lower housing 206 join together with screws not shown in this view. Removable fuse 205, pull ring 204, status light and pushbutton overlay 202, latch mechanism 203 and latch pushbutton 203 are illustrated protruding from the front of the battery pack. Reference numeral 207 indicates space for a manufacturer's logo or trademark. Pull ring 204 provides a convenient way for a user of the power supply system to remove the battery pack from the enclosure while simultaneously depressing the latch mechanism push button. Pull ring 204 also provides a convenient handle by which the battery pack may be easily carried or clipped to a belt or other structure for ease of handling. Indicia, namely, positive, negative and information indicators denote respective electrical interconnection slots. Removal of fuse 205 isolates the lithium ion battery cells within the battery pack from the remainder of the battery packs stored or in use in the power supply enclosure exemplified in FIG. 1.

Figure 3:
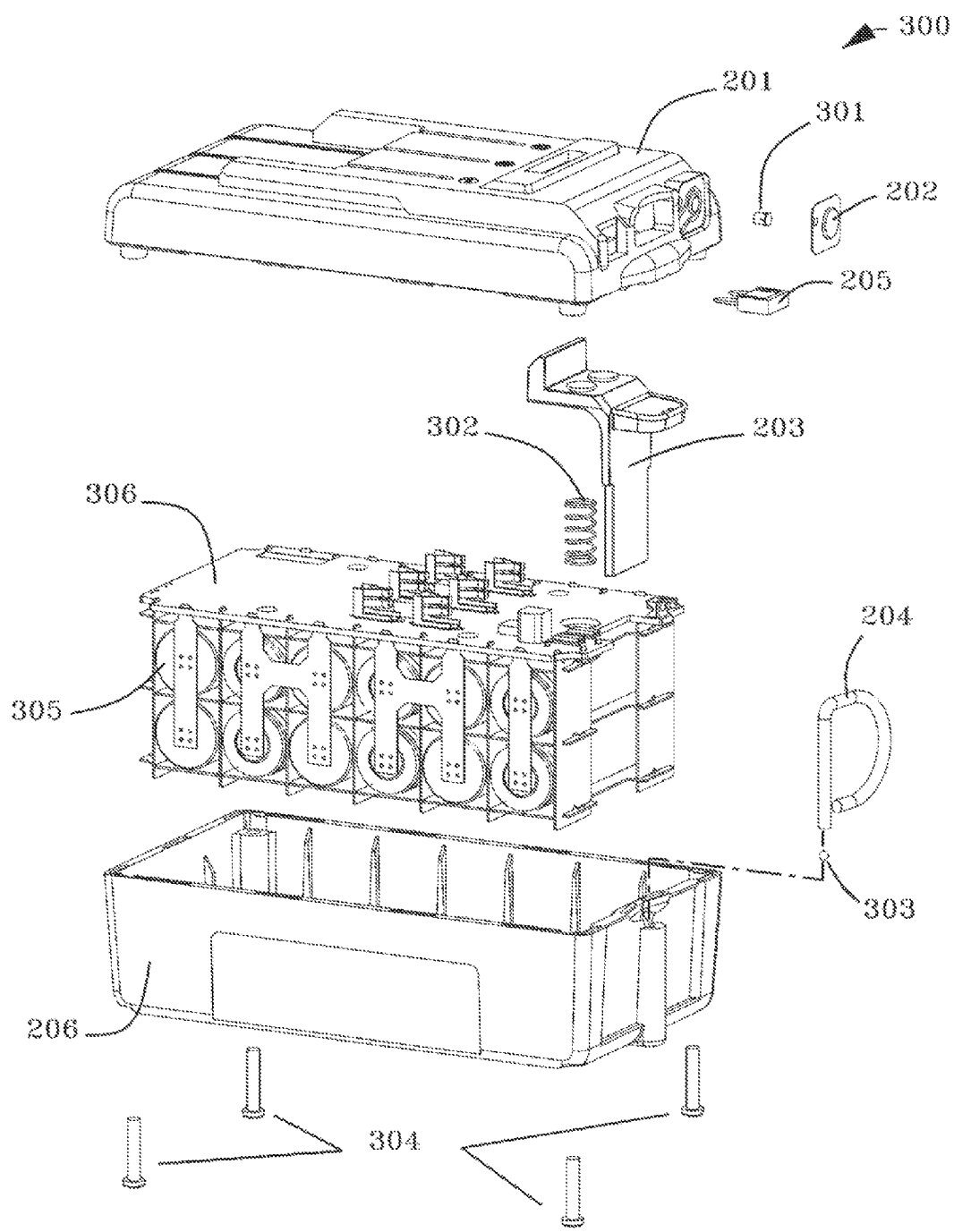
FIG. 3 is an exploded view of the battery pack in FIG. 2.

FIG. 3 is an exploded view 300 of the intelligent battery pack in. FIG. 1 Light pipe 301 communicates light from an LED positioned on the controller circuit/printed circuit board 306. Spring 302 provides variable resistance to the depression of the latch pushbutton/latch mechanism 203 which enables the intelligent heated battery pack to be removed form the power supply. Rubber ball 303 acts as a compression spring securing pull ring 204 in place when it is in detents in its deactivated position against the battery pack. Fasteners 304 secure the battery pack lower housing 206 to the upper housing 201. Core pack 305 and controller circuit 206 are also illustrated in FIG. 3.

Figure 4:
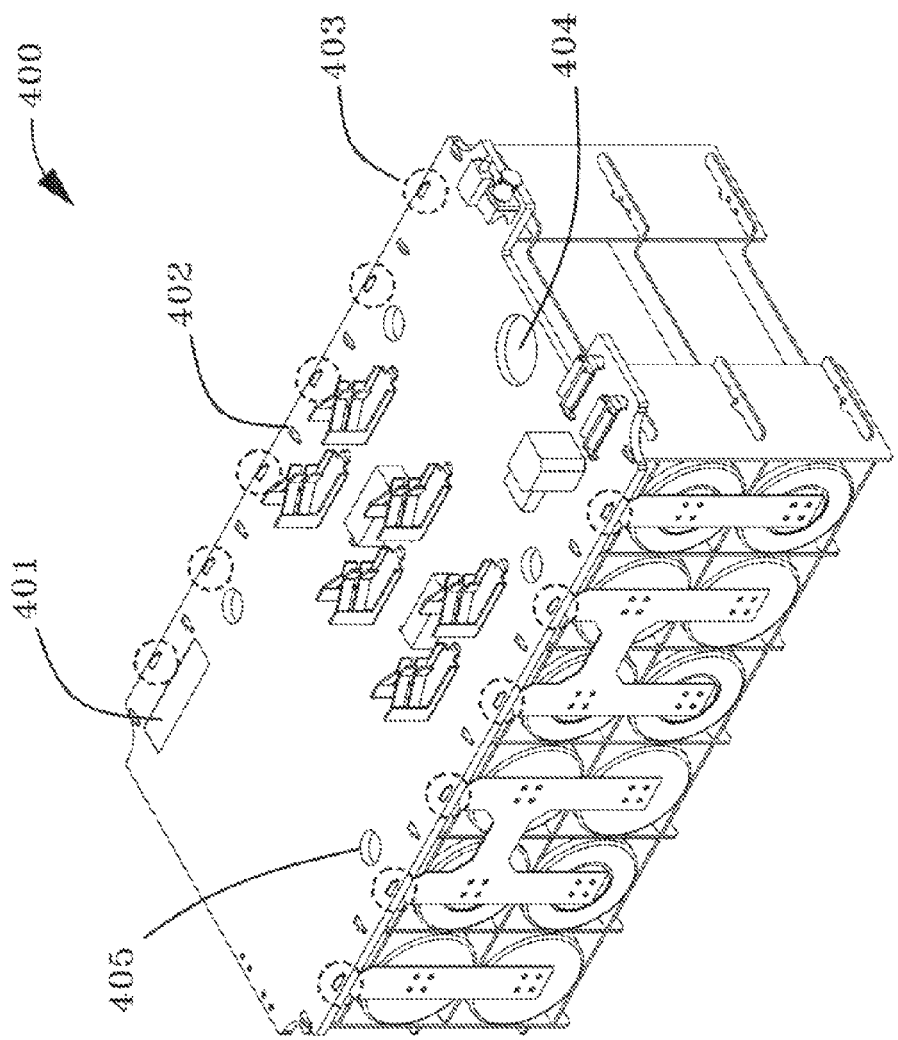
FIG. 4 is a view of the core battery pack 400 including the battery cells, fuse receptacle and heater elements.

FIG. 4 is a view of the core battery pack 400 including the battery cells, fuse receptacle and heater elements. Reference numeral 401 is the controller circuit programming interface. Core pack locator tabs 402 are illustrated interengaging apertures in the upper printed circuit board. These core pack locator tabs 402 provide stability and rigidity to the core pack. Cell electrical interface 403 allows power or electrical measurements to be effected through communication with the upper printed circuit board. Spring retaining hole 404 serves to retain spring 302 which opposes depression of the latch mechanism. Upper housing interlocking hole 405 mates with the pack upper housing and provides stability for the assembly.

Figure 5:
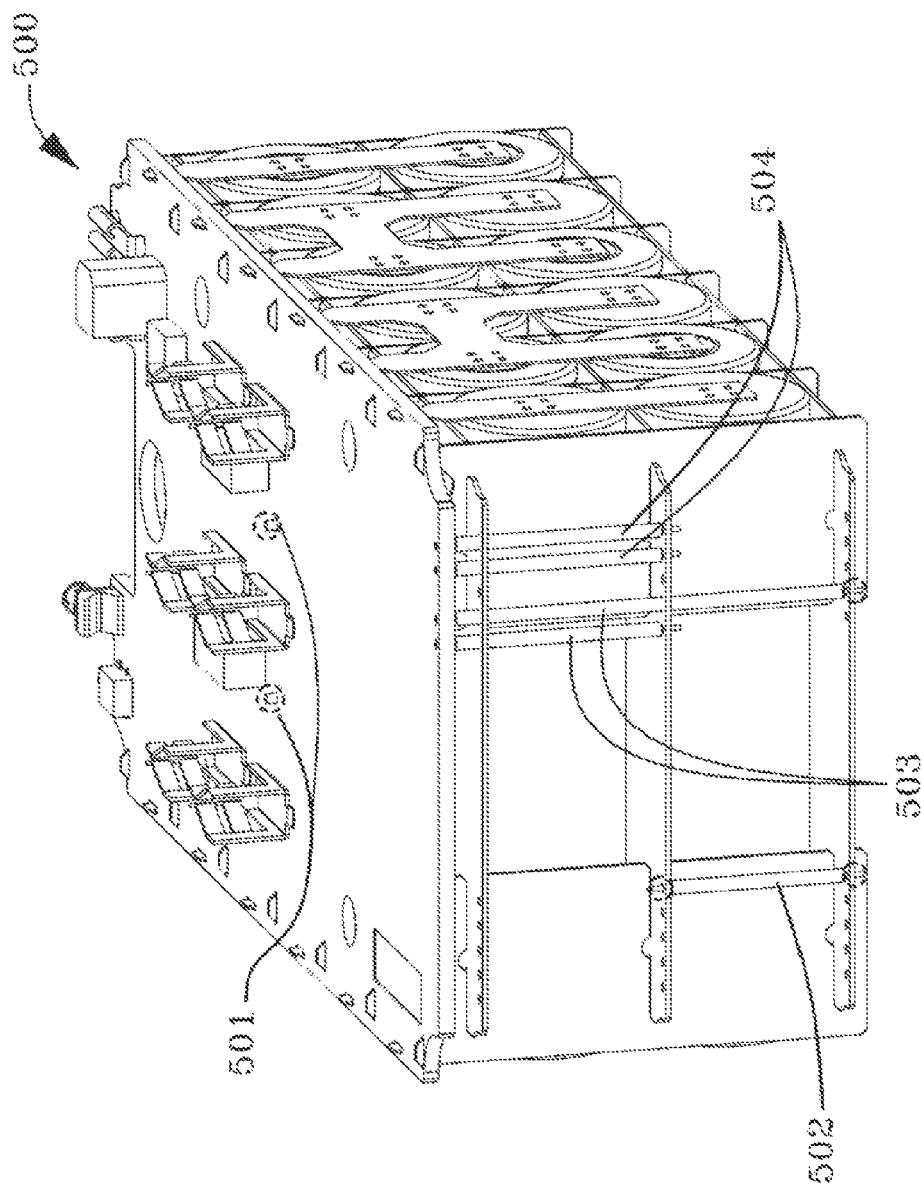
FIG. 5 illustrates the core battery pack including the electrical connections of the controller and the heater elements, the electrical connections of the controller and the thermistor (the temperature sensor), and the electrical connections between the heater elements.

FIG. 5 illustrates the core battery pack 500 including electrical connections of the controller and the heater elements. Reference is made to FIG. 11, an illustration 1100 alone side of the battery pack controller circuit board wherein the microcontroller 1101, the heater electronic switch 1102, heater wire connections 503, and the thermistor connections 504 are shown. Referring to FIG. 5, wires 503 connect the controller module 306 to the middle heater board 702 and to the bottom heater board 704. Wire 502 connects the middle heater hoard 702 with the bottom heater board 704. The top heater board 701 is not used in this example. Being so connected by wires as shown, current is enabled to flow through switch located at 1102 on the controller board 306 to the shorter of the wires 503, through the shorter wire 503 to the middle heater board 702, through the heating element 905 of the middle heating board 702 to the terminal, at wire 502, through wire 502 to the bottom heating board 704, through the heating element of the bottom heating board 704 to the terminal at the longer wire 503, through the longer wire 503 back to the controller board 306 thus completing the heater circuit using two heater boards in a series configuration.

Still referring to FIG. 5, temperature measurements based upon a thermistor located on the Middle heater board 702 at location 901 as shown in FIG. 9 are enabled by wire connections 504 between the controller board 306 and the aforementioned thermistor located at 901.

Still referring to FIG. 11 the thermal cutoff (TCO) electrical interface 1106, the core pack locator tab hole 1103 and a cell electrical interface 1104 is shown. The pack latch mechanism clearance notch 1105 at one end of the battery pack controller circuit board is also illustrated making mechanical clearance for the latch mechanism 203 shown in FIG. 3 and elsewhere.

Figure 6A:
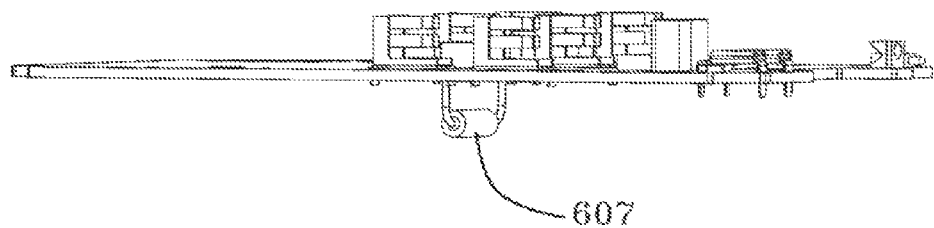
FIG. 6A is a side view of the battery pack controller circuit board illustrating the temperature cutoff device.

FIG. 6 illustrates 600 the battery pack controller circuit board, the pushbutton switch 601 to query the status of or communicate pre-heating or other commands to the battery pack, the LED 602 which may indicate the status of the battery pack in response to the user pressing the pushbutton switch 601. Additionally, the fuse connector 603 is illustrated to receive the fuse 205. The negative pack electrical contact 604, the positive pack electrical contact 606 and the information pack electrical contact 605 are illustrated in FIG. 6. FIG. 6A is aside view of the battery pack controller circuit board illustrating the temperature cut off device 607.

Figure 7:
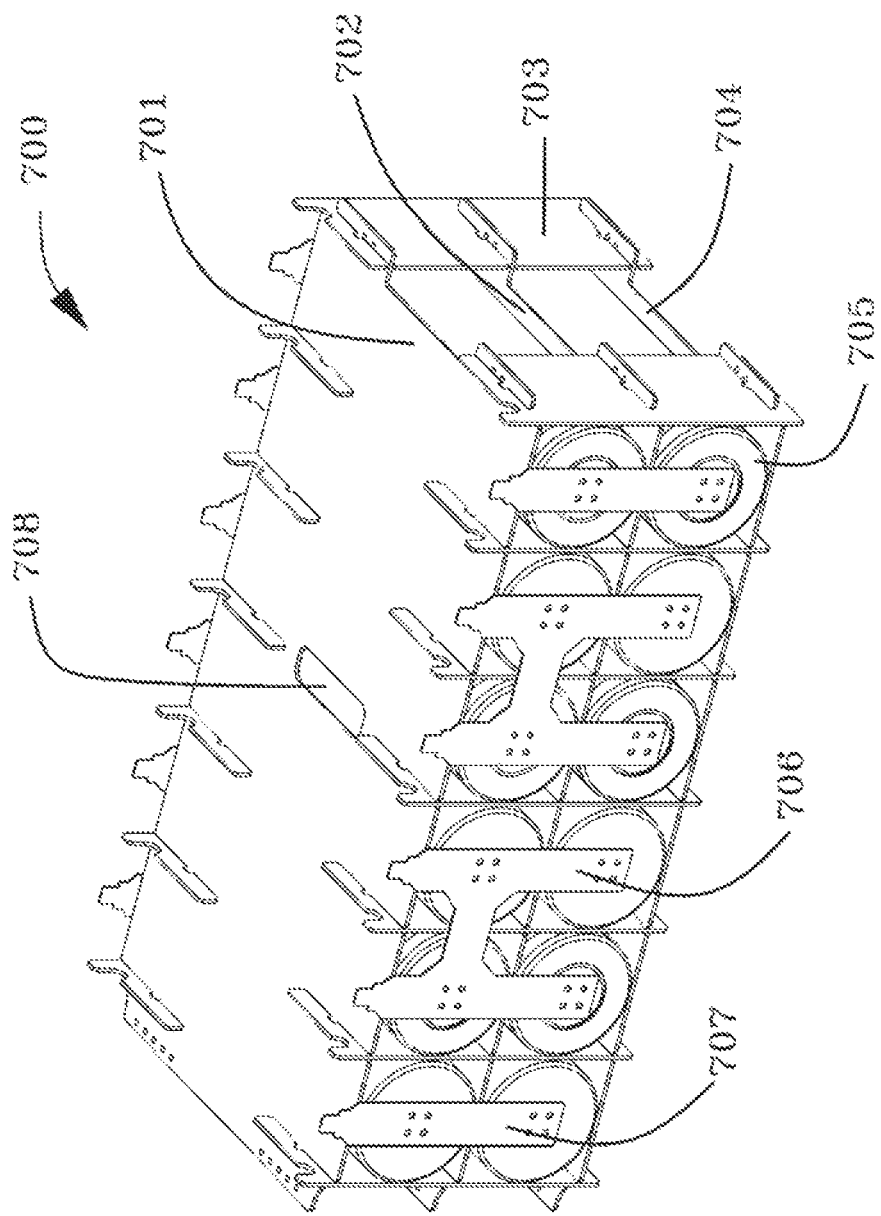
FIG. 7 is another view of the core pack 700 without the controller circuit board illustrating the heater elements surrounding the battery cells.

FIG. 7 is another view of the core pack 700 without the controller circuit board heater elements surrounding the battery cells. Top heater element 701, middle heater element 702, heater element support member 703, and bottom heater element 704 are illustrated in FIG. 7.

Figure 8:
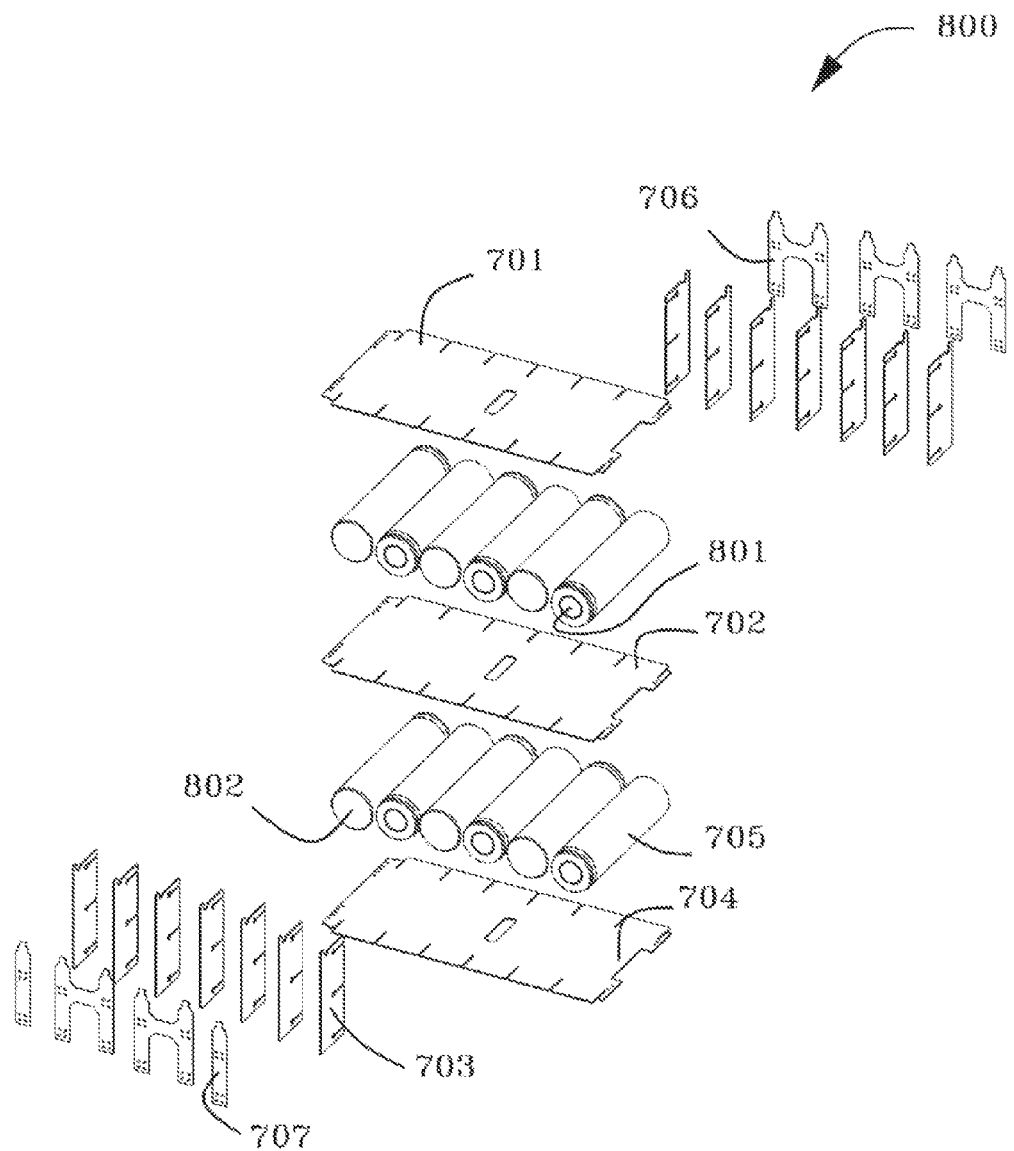
FIG. 8 is an exploded view of the assembly shown in FIG. 7.

Battery cell 705, H-shaped weld tab 706, and I-shaped weld tab 707 and a clearance or void 708 for the thermal cutoff device are also illustrated in FIG. 7. FIG. 8 is an exploded view 800 of the assembly shown, in FIG. 7. A cell positive terminal 801 is illustrated as is a cell negative terminal. 802. FIG. 8 does not illustrate any of the heating traces, these traces being clearly exemplified in FIGS. 9 and 10.

FIG. 9 is an illustration 900 of one side, for example, the front side of a heater element printed circuit board 9, reference numeral 907 points to a fatter or wider part of the heater trace work. The fat or wide trace is located where the cylindrical cells touch the heater PCB. The power dissipated in the trace work and therefore the temperature of the trace work is proportional to the resistance of the trace work which in turn is inversely proportional to the width of the trace work. For example, the trace work gets hottest away from the cell contact point and, ignoring thermal conduction in the copper for the moment, stays cooler where it is fat and in contact with the cell. Thermistor solder location 901 is illustrated approximately in the middle of the board and traces interconnect terminal thermistor wire interface locations 902 which in turn communicate with electrical connections 504 as illustrated in FIG. 5 and described above. Heater element wire interface locations 903 are illustrated for interconnection with the controller via wires 503 as illustrated in FIG. 5 as well.

Still referring to FIG. 9, reference numeral 904 is the front side of the printed circuit board and the heater printed circuit trace-work 905 is well viewed. The printed circuit substrate 904 may be made of fiberglass reinforced epoxy material or many other materials well suited for printed circuit implementations and a variety of temperature and mechanical environments. Support member interlocking-notches, 906 and the fatter heater relief circuit trace-work 907 are also shown in FIG. 9.

FIG. 10 is an illustration 1000 of opposite side (back side) 1001 of the heater element printed circuit board of FIG. 9.

Figure 12:
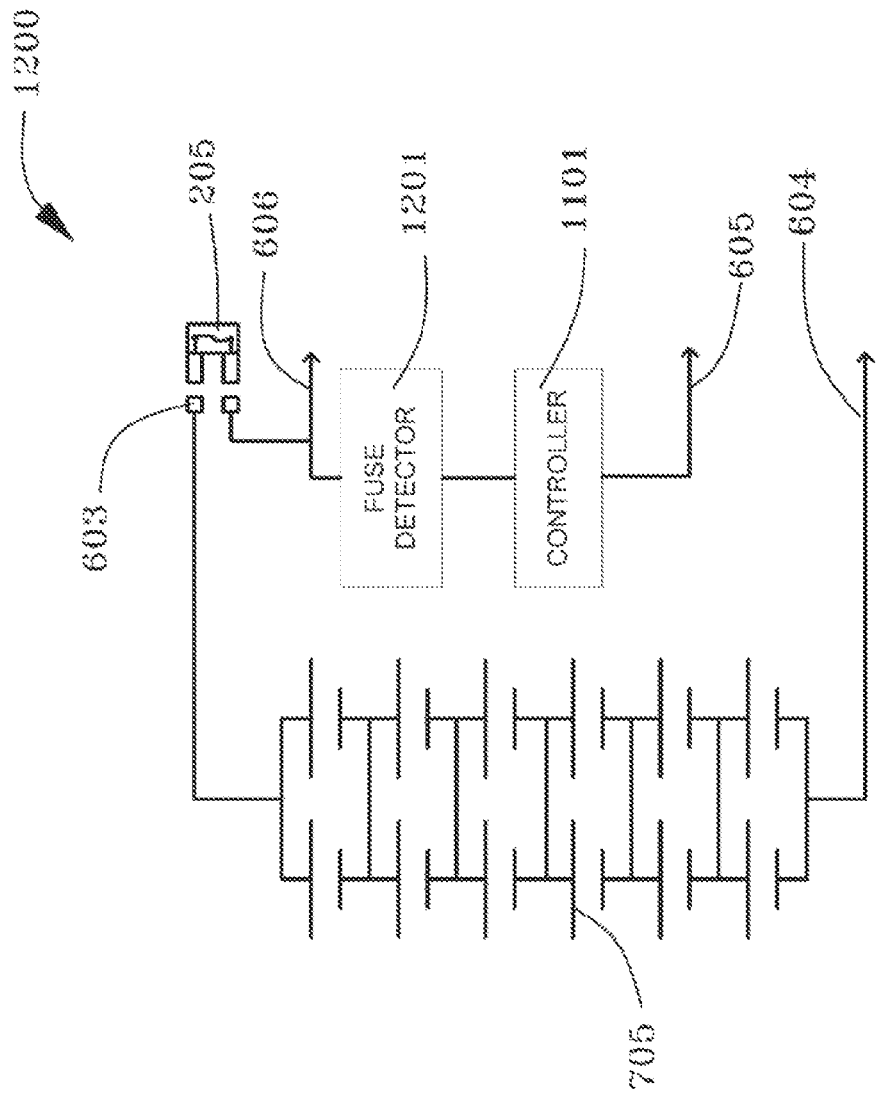
FIG. 12 is a block diagram showing the connection of the battery cells, fuse receptacle, fuse, battery pack electrical contacts, and information communications contact.

FIG. 12 is a schematic block diagram illustrating the connection of the battery cells 705, fuse receptacle 603, fuse 205, battery pack electrical contacts 604, 606, and information communications contact 605. A fuse detector sulks the voltage on positive electrical contact 606 and communicates the presence of the fuse to the controller 1101. Controller 1101 is also sensing the battery temperature as measured by the thermistor located at 901 for example. Alternatively, fuse socket or receptacle 603 could be placed in series with the negative electrical contact.

Figure 13:
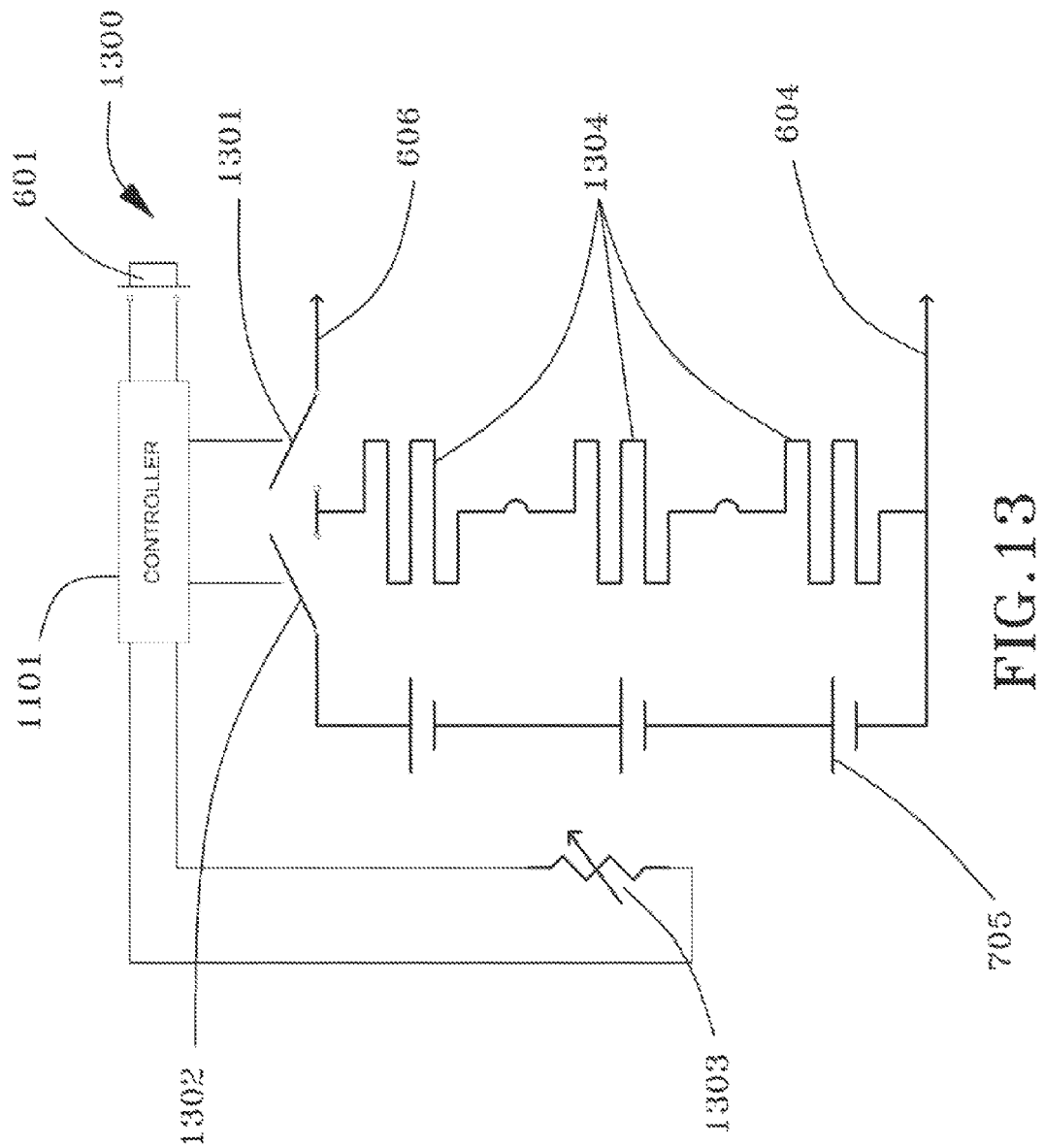
FIG. 13 is a block diagram showing the connections of the battery cells, battery contacts, heater switches, heater elements, controller, and thermistor.

FIG. 13 is a schematic diagram 1300 illustrating the connections of the battery cells 705, battery contacts 604, 606, heater switches 1301, 1302, heater elements 1304, 905, 907, controller 1101, and thermistor 1303. A certain liberty has been taken with the drawing figures in that heater elements are denoted symbolically using reference numeral 1304 on FIG. 13 while the physical resistive elements of an actual heater are referred to using reference numerals 905, 907 on FIG. 9. Reference numeral 1301 indicates the switch to the external source supplied by contact 606 and reference numeral 1302 indicates that the heating circuit is supplied internally by the battery cells 705. Pushbutton 601 may be used to signal the controller to initiate heating or to acquire status information about the battery pack of interest.

Figure 14:
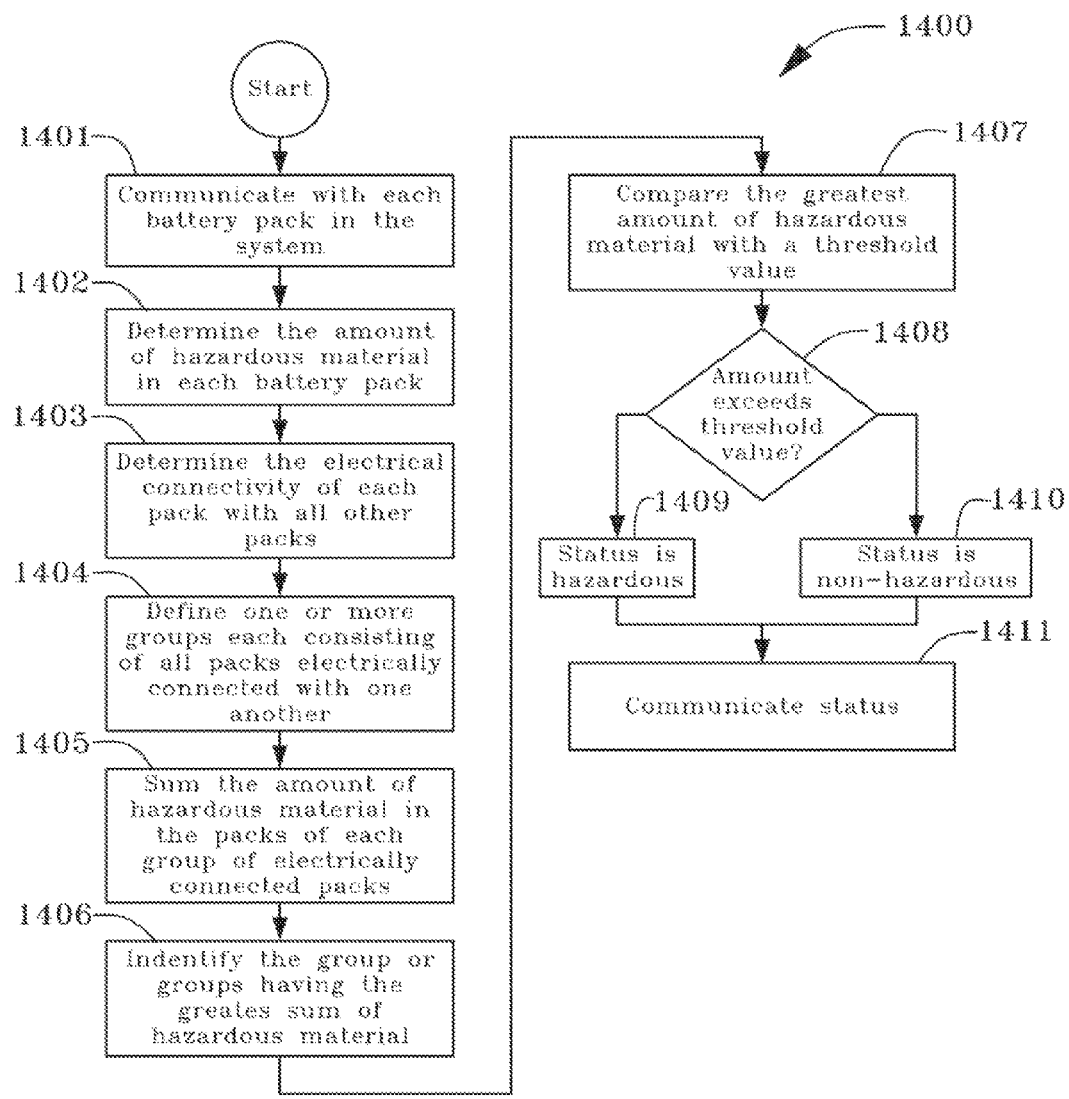
FIG. 14 is a schematic illustrating the process of communicating the hazardous content of the battery packs.

FIG. 14 is a schematic 1400 illustrating the process of communicating the hazardous content of the battery packs. A process of determining the hazardous status of a system comprising a plurality of battery packs for transportation safety purposes, comprises the steps of communicating with each battery pack in the system 1401; determining the amount of hazardous material in each battery pack 1402; determining the electrical connectivity of each pack with all other packs 1403; defining one or more groups, each group consisting of all packs electrically connected with one another 1404; summing the amount of hazardous material in the packs of each group of electrically connected packs 1405; identifying the group or groups having the greatest sum of hazardous material 1406; comparing the greatest sum value with a threshold value 1407; determining the hazardous status based upon the result or the preceding comparison 1409, 1410, and, communicating the result of the hazardous status determination 1411.

Figure 15:
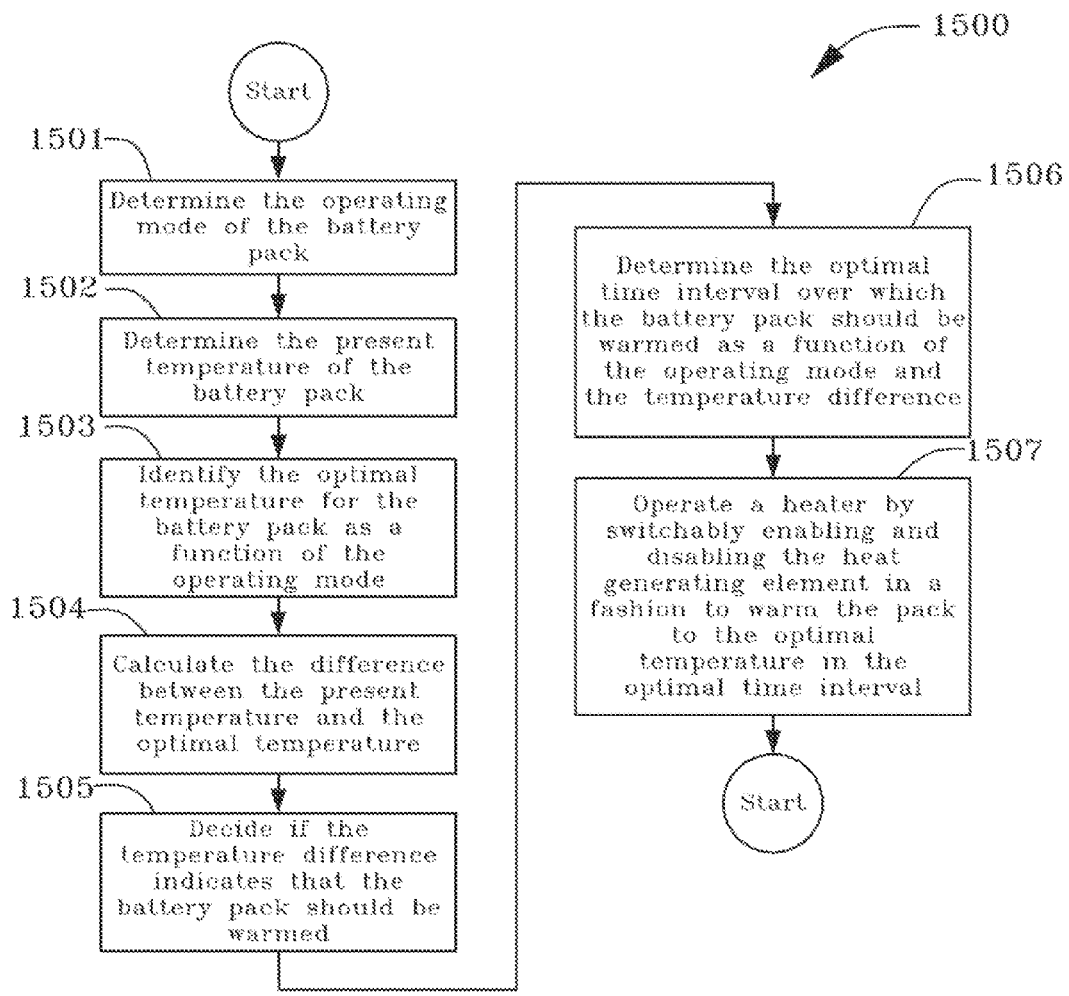
FIG. 15 is a schematic illustrating the process to operate the heater.

FIG. 15 is a schematic 1500 illustrating the process to operate the heater 1304. A process of controlling the temperature of a battery pack comprises the steps of: determining the operating mode of the battery pack 1501; determining the present temperature of the battery pack 1502;

identifying the optimal temperature for the battery pack as a function of the previously determined operating mode 1503; calculating the difference between the previously measured present temperature and the previously identified optimal temperature 1504; deciding if the temperature difference indicates that the battery pack should be warmed 11505; determining the optimal time interval over which the battery pack should be warmed as a function of the previously determined operating mode and the previously calculated temperature difference 1506; and, operating a heater by switchably enabling and disabling the heat generating element in a fashion to warm the pack to the previously identified optimal temperature in the previously determined optimal time interval 1507.

LIST OF REFERENCE NUMERALS

100 Intelligent power supply device comprising multiple battery packs
  101 enclosure
  102 removable cartridge energy packs
  103 shelves
  104 connecting rods
  105 tube spacers
  106 aperture in shelf
  107 front door portion
  108 door open sensor
  109 threaded screw
  110 printed circuit board
  111 spring loaded lock
  112 spring loaded lock
  117 fan
  117A vent
  118 lip
  122A cabling
  125 connecting rods
  127 nuts
  129 fastening bars
  138 conduit
  139 wires
200 intelligent heated battery pack.
  201 Pack upper housing
  202 Overlay
  203 Pack latch mechanism
  204 Pull ring
  205 Fuse
  206 Pack lower housing
  207 Label site
300 Intelligent heated battery pack, exploded view
  301 Light pipe
  302 Spring
  303 Rubber ball
  304 Fasteners
  305 Core pack
  306 Controller circuit
400 Core battery pack
  401 Controller circuit programming interface
  402 Core pack locator tabs
  403 Cell electrical interface
  404 Spring retaining hole
  405 Upper housing, interlocking hole
500 Core battery pack showing heater interconnection.
  501 Temperature cutoff (TCO) device interface
  502 Electrical connection between heater elements
  503 Electrical connection between controller and heater elements
  504 Electrical connections to thermistor
600 Battery pack controller circuit board
  601 Pushbutton switch
  602 LED
  603 Fuse connector
  604 Negative pack electrical contact
  605 Information pack electrical, contact
  606 Positive pack electrical contact
  600A Battery pack controller circuit board, side view
  607 Temperature cutoff (TCO) device
700 Core pack without controller circuit board
  701 Top heater element
  702 Middle heater element
  703 Heater element support member
  704 Bottom heater element
  705 Battery cell.
  706 Weld tab, H-shaped
  707 Weld tab, I-shaped
  708 Clearance for TCO
800 Core pack without controller circuit board, exploded view
  801 Cell positive terminal
  802 Cell negative terminal
900 Heater circuit board, front side
  901 Thermistor solder location
  902 Thermistor wire interface location
  903 Heater element wire interface location
  904 Printed circuit board, front side
  905 Heater printed circuit trace-work
  906 Support member interlocking notch
  907 Heater relief circuit tracework
1000 Heater circuit board, back side
  1001 Printed circuit board, back side
1100 Battery pack Controller circuit board
  1101 Microcontroller
  1102 Heater control switch
  1103 Core pack locator tab hole.
  1104 Cell electrical interface 1105 Pack latch mechanism clearance notch
1106 TCO electrical interface
1200 Schematic of fuse detector function
1201 Fuse detector circuit
1300 Schematic of heater function
1301 External source to heater switch
1302 Internal source to heater-switch
1303 Thermistor
1304 Heater elements
1400 Schematic illustration of the process of communicating the hazardous content of the battery packs.
1401 Communicating with each battery pack in the system
1402 Determining the amount of hazardous material in each battery pack
1403 Determining the electrical connectivity of each pack with all other packs
1404 Defining one or more groups, each group consisting of all packs electrically connected with one another
1405 Summing the amount of hazardous material in the packs of each group of electrically connected packs;
1406 Identifying the group or groups having the greatest sum of hazardous material;
1407 Comparing the greatest sum value with a threshold value
1408 Determining the hazardous status based upon the result of the preceding comparison
1409 Communicating the result of the hazardous status determination
1500 Schematic illustrating the process to operate the heater
1501 Determining the operating mode of the battery pack
1502 Determining the present temperature of the battery pack
1503 Identifying the optimal temperature for the battery pack as a function of the previously
 determined operating mode
1504 Calculating the difference between the previously measured present temperature and the previously identified optimal temperature
1505 Deciding if the temperature difference indicates that the battery pack should be warmed
1506 Determining the optimal time interval over which the battery pack should be warmed as a function of the previously determined operating mode and the previously calculated temperature difference
1507 Operating a heater by switchably enabling and disabling the heat generating element in a fashion to warm the pack to the previously identified optimal temperature in the previously determined optimal time interval The invention described herein has been set forth by way of example only. Those skilled in the art will readily recognize that changes may be made to the invention without departing from the spirit and scope of the invention as defined by the claims which are set forth below.

I claim:

1. A process of determining the hazardous status of a system comprising a plurality of battery packs for transportation safety purposes, comprising the steps of:
communicating with each battery pack in said system;
determining the amount of hazardous material in each battery pack;
determining the electrical connectivity of each pack with all other packs;
defining one or more groups, each group consisting of all packs electrically connected with one another;
summing the amount of hazardous material in the packs of each group of electrically connected packs;
identifying the group or groups having the greatest sum of hazardous material;
comparing the greatest sum value with a threshold value;
determining the hazardous status based upon the result of the preceding comparison and, communicating the result of the hazardous status determination.

* * * * *